United States Patent [19]
Ikeda et al.

[11] Patent Number: 6,046,769
[45] Date of Patent: Apr. 4, 2000

[54] SENSING APPARATUS

[75] Inventors: Keiichi Ikeda, Yokohama; Tsuguhide Sakata, Sagamihara; Masaru Kawamura, Tokyo, all of Japan

[73] Assignee: Canon Kabushiki Kaisha, Tokyo, Japan

[21] Appl. No.: 08/887,565

[22] Filed: Jul. 3, 1997

Related U.S. Application Data

[63] Continuation of application No. 08/395,390, Feb. 27, 1995, abandoned.

[30]  Foreign Application Priority Data

Feb. 28, 1994 [JP] Japan .................................. 6-029505
Apr. 28, 1994 [JP] Japan .................................. 6-091690
Feb. 13, 1995 [JP] Japan .................................. 7-024205

[51] Int. Cl.[7] .................................................. H04N 5/228
[52] U.S. Cl. ........................... 348/222; 348/233; 348/211
[58] Field of Search ..................................... 348/222, 233, 348/207, 211–214, 231, 239, 345, 347, 357, 369, 15, 722; 358/335; H04N 5/225, 5/228

[56]  References Cited

U.S. PATENT DOCUMENTS

| | | |
|---|---|---|
| 4,797,751 | 1/1989 | Yamaguchi ............................. 358/335 |
| 4,873,580 | 10/1989 | Katoh et al. . |
| 5,038,163 | 8/1991 | Hirasawa . |
| 5,138,503 | 8/1992 | Nishida ................................... 348/233 |
| 5,267,025 | 11/1993 | Satoh ...................................... 348/222 |
| 5,387,930 | 2/1995 | Toh ......................................... 345/207 |
| 5,389,968 | 2/1995 | Koyanagi et al. ..................... 348/222 |
| 5,436,660 | 7/1995 | Sakamoto ............................... 358/207 |
| 5,475,441 | 12/1995 | Parulski et al. ........................ 348/207 |
| 5,486,853 | 1/1996 | Baxter et al. ........................... 348/222 |
| 5,493,332 | 2/1996 | Dalton et al. .......................... 348/207 |
| 5,528,292 | 6/1996 | Ikeda ...................................... 348/222 |
| 5,696,553 | 12/1997 | D'Alfonso et al. .................... 348/211 |

FOREIGN PATENT DOCUMENTS 0394071 10/1990 European Pat. Off. .
5-227459 9/1993 Japan .

*Primary Examiner*—Michael H. Lee
*Attorney, Agent, or Firm*—Morgan & Finnegan, LLP

[57]  ABSTRACT

In an image sensing apparatus, by forming a signal processing unit which processes a signal from an image sensing unit on an expansion board of a computer or a PCMCIA card, it is possible to easily control the image sensing unit, process a signal from the computer, and by taking an image signal into an image processing unit immediately, reduces deterioration of the signal. Further, the image sensing unit is separated from the signal processing unit, and data specific to the image sensing unit is processed by the signal processing unit, thereby various types of image sensing units can be controlled.

29 Claims, 18 Drawing Sheets

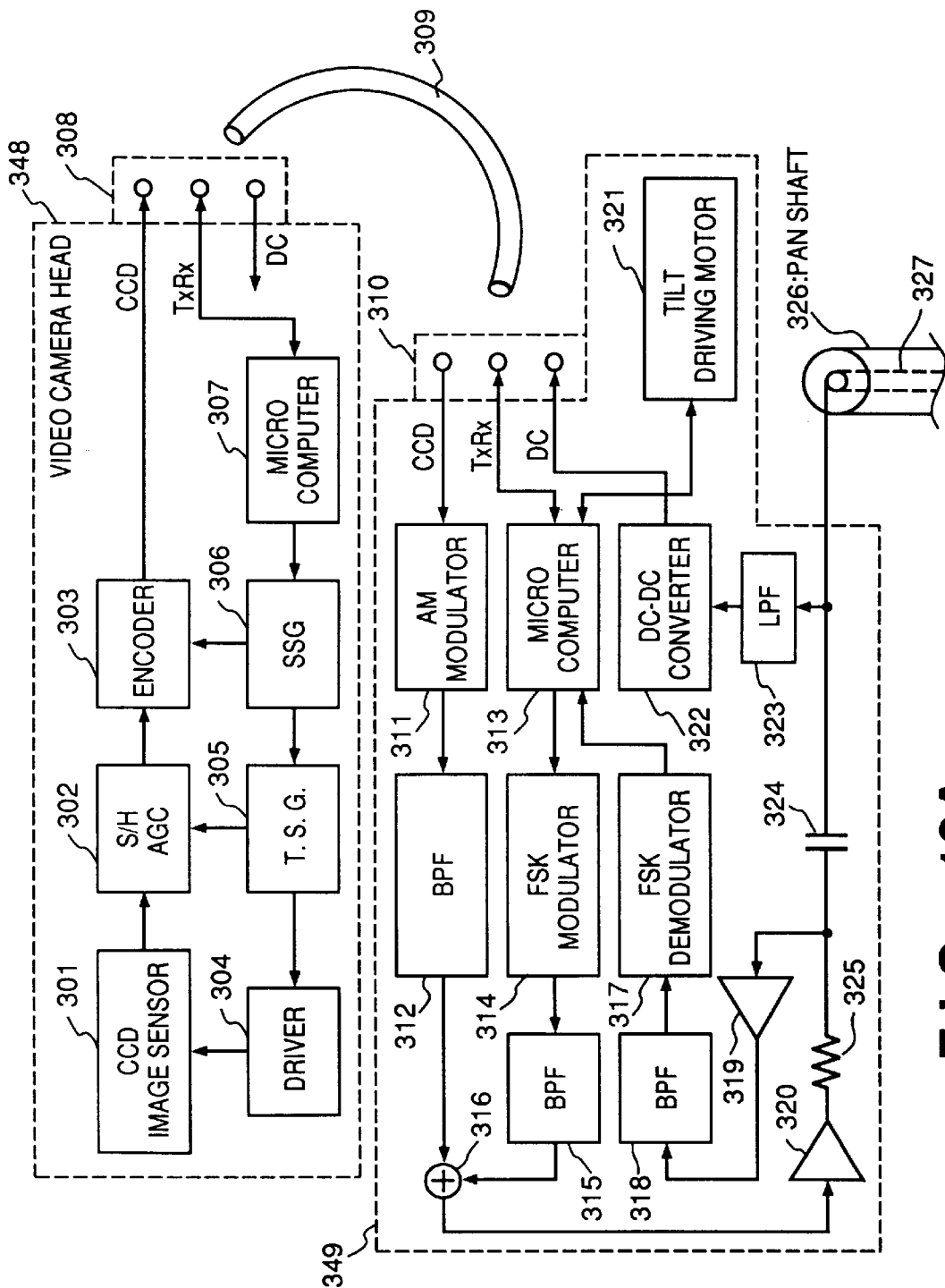
F I G. 12A

SENSING APPARATUS

This is a continuation of application Ser. No. 08/395,390, filed on Feb. 27, 1995 abandoned.

BACKGROUND OF THE INVENTION

The present invention relates to an image sensing apparatus for inputting images into computers and, more particularly, to an image sensing apparatus which directly controls various functions for inputting images using a computer.

An apparatus which inputs a picked-up images and makes realize desk top publishing (DTP) and a visual telephone by using a computer has become common. Accordingly, the conventional apparatus has a configuration as shown in FIG. 18 in order to input a sensed image into the computer.

In FIG. 18, reference numeral 400 denotes a conventional video camera as an image sensing device whose block diagram is shown in the figure, and reference numeral 420 denotes a video input board included in a computer (not shown). The image sensing device 400 and the video input board 420 are connected via a video cable 410, and the video input board 420 receives and processes a composite video signal which is outputted from the image sensing device 400.

First, the image sensing device 400 converts a sensed image into an electrical image signal after focusing the image using an optical lens 101P and passing through an iris diaphragm (shutter) 102P on a photo sensor of a CCD 103P. A camera controller 401 controls a motor driver 106P and a driving circuit 107P, thereby changing zooming ratio, iris, shutter speed, and so on, of the lens 101P and the shutter 102P. Further, timing signal for driving the CCD 103 is generated by a timing signal generator 108P.

The electrical image signal obtained at the CCD 103P is a color signal corresponding to a color separation access (not shown) provided in front of the CCD 103P, and a signal processor 402 applies various processes to the electrical image signal, thereby converts it into a luminance signal and a color difference signal. A color separation filter, which is made of small-sized color filters for, say, Cy, Mg, G, and Ye, is so arranged repeatedly in a predetermined order, that each pixel corresponds to each color filter. The luminance signal and the color difference signal are converted into composite video signals by a known encoder 160P, further inputted to the video input board 420. A known decoder 421 in the video input board 420 decodes the inputted composite video signals, thus reproduces the luminance signal and the color difference signal. The luminance signal and the color difference signal, outputted from the decoder 421 is inputted into memory 156P in accordance with control by a memory controller 157P.

The video input board 420 is constructed as an expansion board to be built in a computer, and connected to the computer via computer bus 155P. The computer bus 155P known as ISA Bus, VL Bus, Nu Bus, or the like, includes address lines, data lines, an interruption line, a clock, a read signal, a write signal, power supply, signal ground, and so on. Reference numeral 422 denotes a bus controller which is constructed so as to control the memory controller 157P by reading and interpreting data from the data bus when the video input board 420 is selected, which can be determined by decoding the address signal on the address line of the computer bus 155P. The memory 156P is connected to the computer bus 155P, and the image data stored in the memory 156P is transmitted to the data lines of the computer bus 155P in accordance with control by the memory controller 157P. Thus, a main CPU of the computer can receive the image data and store it in a storage medium, such as a hard disk.

Further, regarding automatic focus, a method is known to focus on an object, by detecting distinction of a display by analyzing an image signal of the object, and by controlling positions of the lens so that the distinction becomes maximum. The distinction is evaluated by using intensity of high frequency component, extracted by using a band-pass filter, of an image signal, or intensity of detection of blurring width, extracted by using a differential circuit, of the image signal. The intensity of the detected blurring width is low when the object is not properly focused, however, it increases as the object becomes better focused, and reaches the maximum value when the object is perfectly focused.

Further, in order to minimize the size of a camera, a conventional camera adopts a group of lenses of a rear focusing type, in which a focusing is achieved by moving a focus compensation lens. FIG. 11 shows examples of graphs representing cam loci. As shown in FIG. 11, relationship between the positions of a zoom lens and a focus compensation lens is not linear, thus, in order to achieve smooth zooming operation, it is necessary to make a table representing the cam locus and calculate the position of the focus compensation lens based on the speed of zooming and the position of the zoom lens. The cam loci stored in the table are inherent to a group of camera lenses.

In order to focus smoothly and at high speed during zooming operation, the focus compensation lens is moved in accordance with the cam locus. Furthermore, in order that the cam locus suitable for a distance to an object is automatically selected, the focus compensation lens is moved in accordance with the cam locus corresponding to the position and speed of the zoom lens, and to the distance to the object, which is based on the calculation performed by referring to the distinction and the cam locus table.

In addition, as "teleconference" has become common recently, several modifications of a tiltable pan head for a video camera used for the teleconference can be suggested.

For example, a construction in which a rotating part of the pan head has coaxial configuration with a single conductor and electrical transmission and reception between a base and the pan head is performed via the coaxial configuration, eliminates interference of wirings provided between the pan head and the base. Thereby the pan head can move freely without limiting its angular movement.

However, in a case where a video camera is used as an image sensing device as described above, an image signal obtained from the CCD is converted into a composite video signal once, then inputted into the video input board. The signal is then decoded and converted into each signal for Y (luminance signal), R-Y, B-Y (color difference signals), and stored in the memory. Therefore, quality of the image is deteriorated comparing to an image reproduced by directly converting a signal read by the CCD into Y, R-Y, and B-Y signal. Further, cost to manufacture the apparatus is higher since the apparatus requires complicated circuit comparing to an apparatus which reproduces an image by directly converting a signal read by the CCD into Y, R-Y, and B-Y signal.

In a case where lenses of a camera are changed, since cam loci differ from lenses to lenses, a cam locus which suits a lens newly attached to the camera can not be used, thus only distinction of an object can be used for determining whether automatic focusing is appropriate. In that case, since characteristics of cam loci are not linear, it takes considerable time to find focusing position of lenses, and zooming operation can not be carried at high speed.

Further, when a cam locus table is used, it is necessary for a camera control circuit to have cam locus tables, each of which is suitable to each attached lens. This requires an image signal processor to have a large memory area. However, the number of tables which can be stored in the memory area is limited, therefore, many kinds of camera heads having different configuration can not be used.

In a case of the aforesaid video camera for teleconference, it is required that the angular speed of the pan head should be increased even the limitation on the rotationable angle of the pan head is freed.

This is very important to design such system that detects verbal sound of a speaker and pans the video camera to pick up the image of a speaker as soon as possible, when a plurality of attendants are in a conference room sitting around a table where a video camera is set in the center of the table.

In order to improve the angular speed of the pan head, there are considered to:
1) Strengthen power of a driving motor for rotating the pan head;
2) Modify the rotating structure of the pan head; and
3) Reduce the weight of the upper portion of the pan head.

SUMMARY OF THE INVENTION

Accordingly, it is an object of the present invention to provide an image sensing apparatus which can be manufactured at a low cost, reproduce high resolution image signal with less deteriorated, and easily control its various image sensing functions by a computer. This can be done by separating an image sensing unit from a signal processor, directly inputting an image signal from the CCD which is obtained at the image sensing unit, into an expansion board included in the computer, performing various signal processings in the expansion board in the computer for producing Y, R-Y, and B-Y signals, and communicating between the image sensing unit and the expansion board in the computer, which makes it possible for the expansion board to control operations, such as zooming operation, focusing, or the like that is conventionally performed by a video camera.

It is another object of the present invention to provide an image sensing apparatus capable of coping with changes of arrangement of a color filter in the image sensing unit and changes to the number of pixels of a CCD, by changing a program loaded in a DSP (digital signal processor) without changing the hardware of the signal processor, in which signal processing conventionally performed in the expansion board of a computer is changed to be performed by the DSP where the program can be loaded.

Still another object of the present invention is to provide an image sensing apparatus capable of controlling various image sensing units at high speed.

Further, still another object of the present invention is to improve the angular speed of the pan head by reducing the weight of the video camera which is one of the heavy elements on the upper portion of the pan head.

In order to achieve the aforesaid object, there is provided an image sensing apparatus comprising:

a camera head unit which comprises: image forming means for forming an optical image of an object; image sensing means for converting the optical image formed by the image forming means into an electrical image signal; and control means for controlling the image forming means, and an image signal processing unit which comprises: signal processing means, connected with the camera head unit via a communication line, for performing predetermined process on the electrical image signal provided by the camera head unit; storage means for storing the image signal obtained by the signal processing means; and communication means for interchanging predetermined data with the camera head unit.

Further, in order to achieve the aforesaid object, there is provided an image sensing apparatus consisting of a camera head unit for forming an optical image of an object and for converting the optical image into an electrical image signal, and of an image signal processing unit, connected to the camera head unit via a communication line, for performing predetermined process on the electrical image signal sent from said camera head unit, wherein the camera head unit comprises: storage means for storing characteristic data of the camera head unit; and transmission means for transmitting the characteristic data to the image signal processing unit via the communication line, and wherein the image signal processing unit comprises: generating means for generating control information for the camera head unit based on the characteristic data transmitted from the camera head unit and the electrical image signal from the camera head unit; and transmission means for transmitting the control information to the camera head unit via the communication line, wherein the camera head unit controls operations thereof on the basis of the control information sent from the image signal processing unit.

Furthermore, in order to achieve the aforesaid object, there is provided an image sensing apparatus consisting of a rotatable stage which includes a video camera having an image sensor and of a base for holding the rotatable stage, the rotatable stage and the base are connected by a rotational shaft, combining means in the video camera, for adding and combining at least a pixel clock, a composite synchronizing signal, and image information from the image sensor before predetermined camera process including at least decoding of a color filtered signal from the image sensor, γ-process, and matrix process, and modulating means for modulating a signal from the combining means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 12A and 12B are block diagrams illustrating a configuration of a tiltable pan head video camera system according to a third embodiment of the present invention;

DETAILED DESCRIPTION OF THE PREFERRED EMBODIMENTS

Preferred embodiment of the present invention will be described in detail in accordance with the accompanying drawings.

<First Embodiment>

Figure 1:
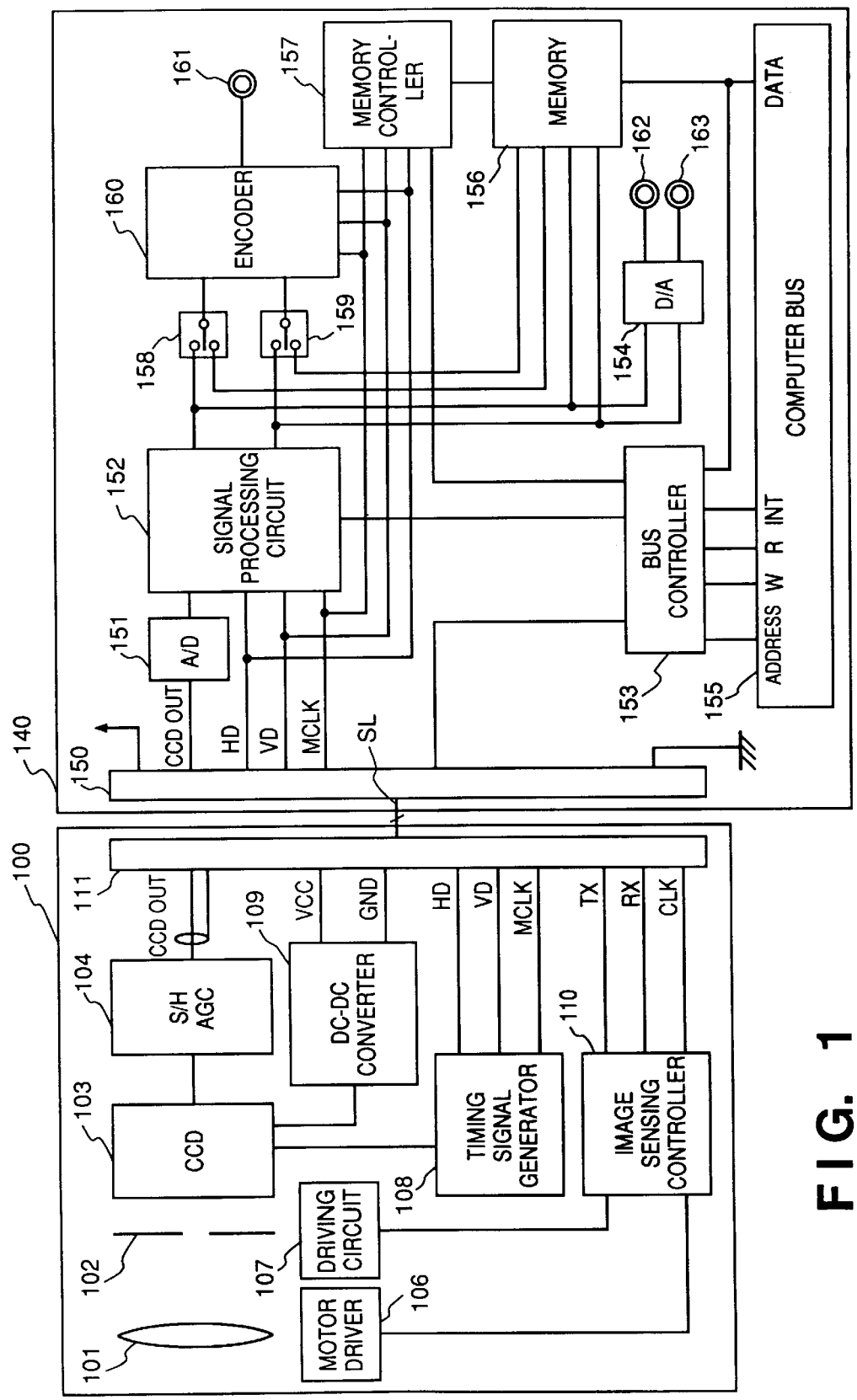
FIG. 1 is a block diagram illustrating a configuration of an image sensing apparatus according to a first embodiment of the present invention.

FIG. 1 is a block diagram illustrating a configuration of an image sensing apparatus according to a first embodiment of the present invention. In FIG. 1, reference numeral 100 denotes an image sensing unit and reference numeral 101 denotes a lens which can control functions, such as automatic focusing and zooming, by a motor driver 106, for optically forming an image of an object. Reference numeral 102 denotes a shutter, and reference numeral 107 denotes driving circuit for driving an iris (shutter). The motor driver 106 and the driving circuit 107 are controlled by an image sensing controller 110.

Further, reference numeral 103 denotes a CCD sensor as image sensing means, and the image of the object coming through the lens 101 focuses on the photo sensors of the CCD 103; and 104, a pre-processor which applies sample and hold process and automatic gain control (AGC) to an image signal read from the CCD 103, and output from the pre-processor is sent to a signal processing board 140 connected via a connector 111 through a cable SL.

Furthermore, a timing signal generator 108 generates a timing signal for driving the CCD 103 and the signal processing board 140, and it also generates various kinds of timing signals on the basis of HD (horizontal synchronizing signal) and VD (vertical synchronizing signal) provided from the signal processing board 140 through the connector 111, and the part of the generated signals is sent to the signal processing board 140 via the connector 111.

A DC—DC converter 109 provides electricity of a stable voltage for driving the CCD 103 by using a power supply provided from the signal processing board via the connector 111. The image sensing controller 110 interchanges serial data with the signal processing board 140 via the connector 111 and controls the entire image sensing unit 100, more specifically, zooming, iris (shutter speed) and the like, in accordance with the control data from the signal processing board 140.

The connector 111 is connected to a connector 150 in the signal processing board 140 via cable SL, and an image signal, various timing signals, signals for serial communication, power supply and signal ground, and so on, are transmitted through these connectors. It should be noted that, instead of using the cable SL, wire-less communication can be employed between the connector 111 and the connector 150.

The signal processing board 140 is provided as a built-in expansion board of a computer. The image signal provided to the signal processing board 140 via the connector 150 is converted into a digital signal by an A/D converter 151, then the converted signal is inputted into a signal processing circuit 152. The signal processing circuit 152 generates a luminance signal Y and color difference signals from the image signal obtained in accordance with the color filters attached to the CCD 103.

In order to generate color difference signals, a color separation unit performs a synchronized detection and a matrix operation on the image signal in order to separate the image signal into R, G, and B signals. After that white balancing and γ correction are applied to these R, G, and B signals, then color difference signals of R-Y and B-Y and generated by using a color difference matrix. Time division duplex is performed on the color difference signals. The luminance signal Y and the duplexed color difference signals generated by the signal processing circuit 152 are then converted into analog signals by a D/A converter 154. A synchronizing signal is added to the luminance signal by a synchronizing signal adding circuit (not shown). This luminance signal and the color difference signals are outputted to an outside of the signal processing board, from a terminal 162 and a terminal 163, respectively. Both signals can be also stored in a memory 156 in accordance with control by a memory controller 157.

The image data (a luminance signal Y and color difference signals) which is stored in the memory 156 and the image data outputted from the signal processing circuit 152 are transmitted to an encoder 160 alternatively by a change-over of switches 158 and 159. Thus, if a composite video signal which is an analog signal generated from the luminance signal and the color difference signals by using a known encoder, is outputted to an external monitor (not shown) from a terminal 161, it is possible to switch to see an image sent from the image sensing unit 100 and an image stored in the memory 156.

Further, reference numeral 155 denotes a bus line of a computer, which generally consists of address lines, data lines, an interruption line, lines for clock, a read signal, and a write signal, power supply, and signal ground. The signal processing board of the present invention is connected to a computer via the bus 155.

A bus controller 153 interprets data on the data line of the bus 155 when the image sensing apparatus of the present invention is selected by an external computer, which can be determined by decoding address signals on the bus 155. By controlling the signal processing circuit 152 and the memory controller 157 in accordance with the value of the data on the data line, and exchanging serial data with the image sensing unit 100 via the connector 150, the image sensing unit 100 can be controlled.

Next, the operation of the image sensing apparatus according to the first embodiment will be described in detail. In the first embodiment, an accesses to a specific address of an address space which is accessible by a computer in accordance with an application program loaded in the computer, enables a CPU of the computer to interchange commands and data with the image sensing apparatus of the present invention. It should be noted that the specific address can be changed by a DIP type switch (not shown).

Assuming that the specific address is assigned to an address of 2000H (H indicates a hexa-decimal number), a computer writes a command at 2000H in accordance with the program loaded in the computer, and the bus controller 153 can determine, by decoding the address signals that the image sensing apparatus of the present invention is selected. Then the bus controller 153 receives the command via the data line and interpret it. The bus controller 153 controls the signal processing circuit 152 and the memory controller 157, controls various functions of the image sensing unit 100, and reads out various status information relating to the image sensing apparatus.

For example, if the command orders to store the image signals in the memory 156, the bus controller 153 controls the memory controller 157 to store a frame of image signals in the memory 156, and if the command orders to read the image signals from the memory 156, then the bus controller 153 sets the memory address of the memory controller 157 to an initial address of the memory which stores the image signals. After that, by incrementing the memory address the bus controller 153 outputs image data stored in the memory 156 to the data line of the bus 155.

The image sensing apparatus is configured so that no image data is outputted to the bus when the address of the address lines is not 2000H, this configuration does not have any effect on the operation of the main CPU. Further, it is possible to write data from the main CPU to the memory 156.

If the command is related to a control of image sensing unit, such as command for zooming and focusing, the bus controller 153 sends the command to the image sensing unit 100 via the connector 150 through the serial communication line. The image sensing controller 110 performs the operation in accordance with the command, so that the image sensing unit 100 is controlled.

As described above, by performing command writing and data reading at the specific address in accordance with an application program loaded in the computer, the main CPU can control the image sensing apparatus. In that case, what is written by using the application program loaded in the computer includes not only the command but also parameters which are necessary to perform various controls.

Further, when a single command is executed by the bus controller 153 of the image sensing apparatus of the present invention, a response status data corresponding to the command is set in the status register of the bus controller 153, then the status data is transmitted to the data line of the bus 155 when the next reading operation of the specific address is performed. Thereby, the status data is returned to the main CPU, and the operational situation of the image sensing apparatus can be transmitted.

Further, when there is a command related to a request to read out the status data, functions, or the like, the information is set in the status register in the bus controller 153 after the status data corresponding to the command is set, this makes it possible that unnecessary data need not be read out.

<First Modification>

Figure 2:
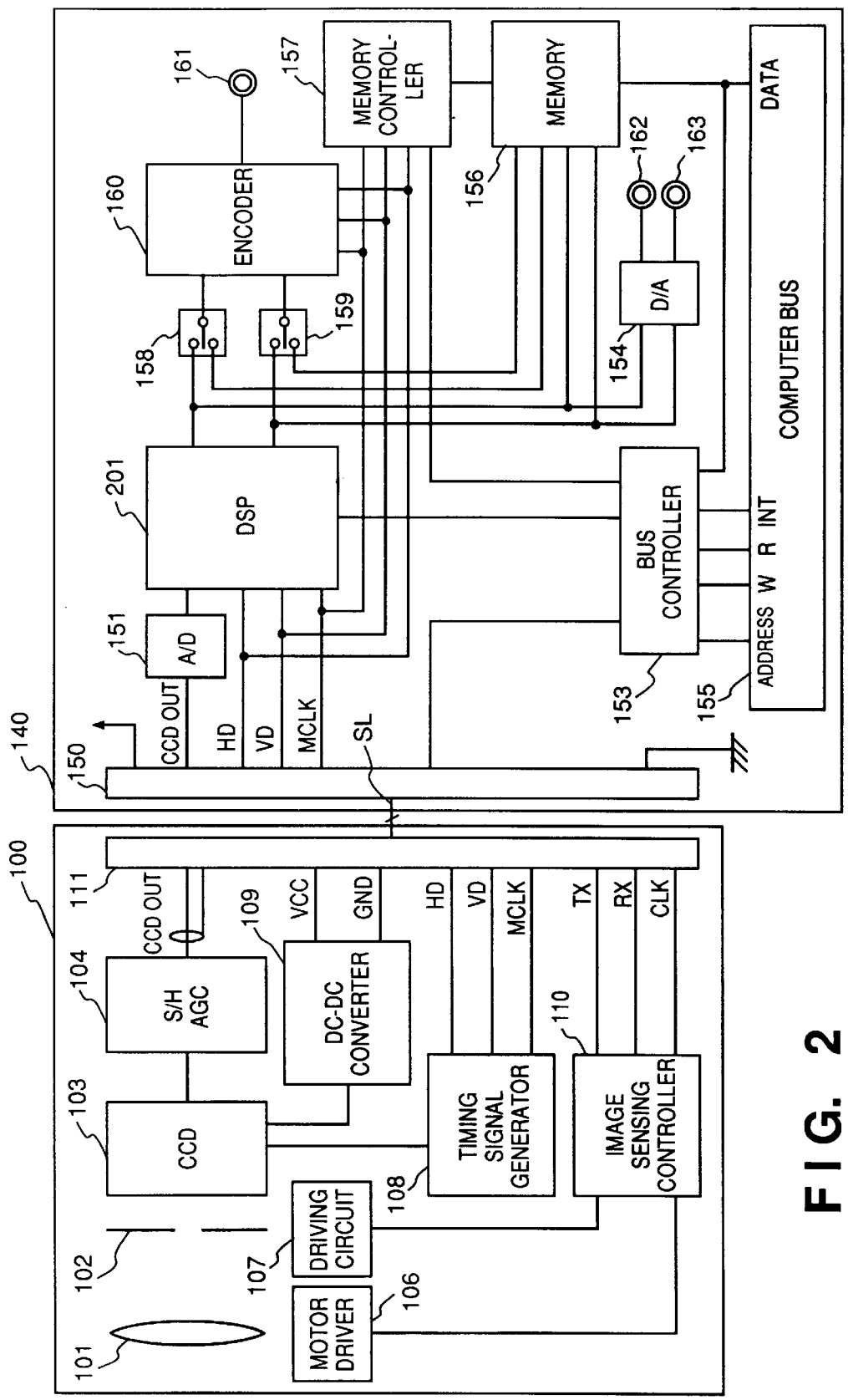
FIG. 2 is a block diagram illustrating a configuration of an image sensing apparatus according to a first modified example of the first embodiment.

Referring to FIG. 2, a configuration and operation of an image sensing apparatus according to a first modification of the first embodiment will be described. FIG. 2 is a block diagram illustrating the configuration of the image sensing apparatus according to the first modification of the first embodiment. In FIG. 2, the same reference numerals as in FIG. 1 denotes the same elements, devices, or the like. In the first modification, the signal processing circuit 152 which is constructed in hardware in the first embodiment is replaced by a DSP (Digital Signal Processor) 201 which can load an application program. The DSP 201 can perform programmable signal processing, not fixed signal processing, by a program loaded from the main CPU through the computer bus 155 via the bus controller 153. Since the image sensing unit 100 and the signal processing board 140 are electrically connected, the bus controller of the signal processing board 140 can detect the change when the image sensing unit 100 is changed to another unit.

Figure 3:
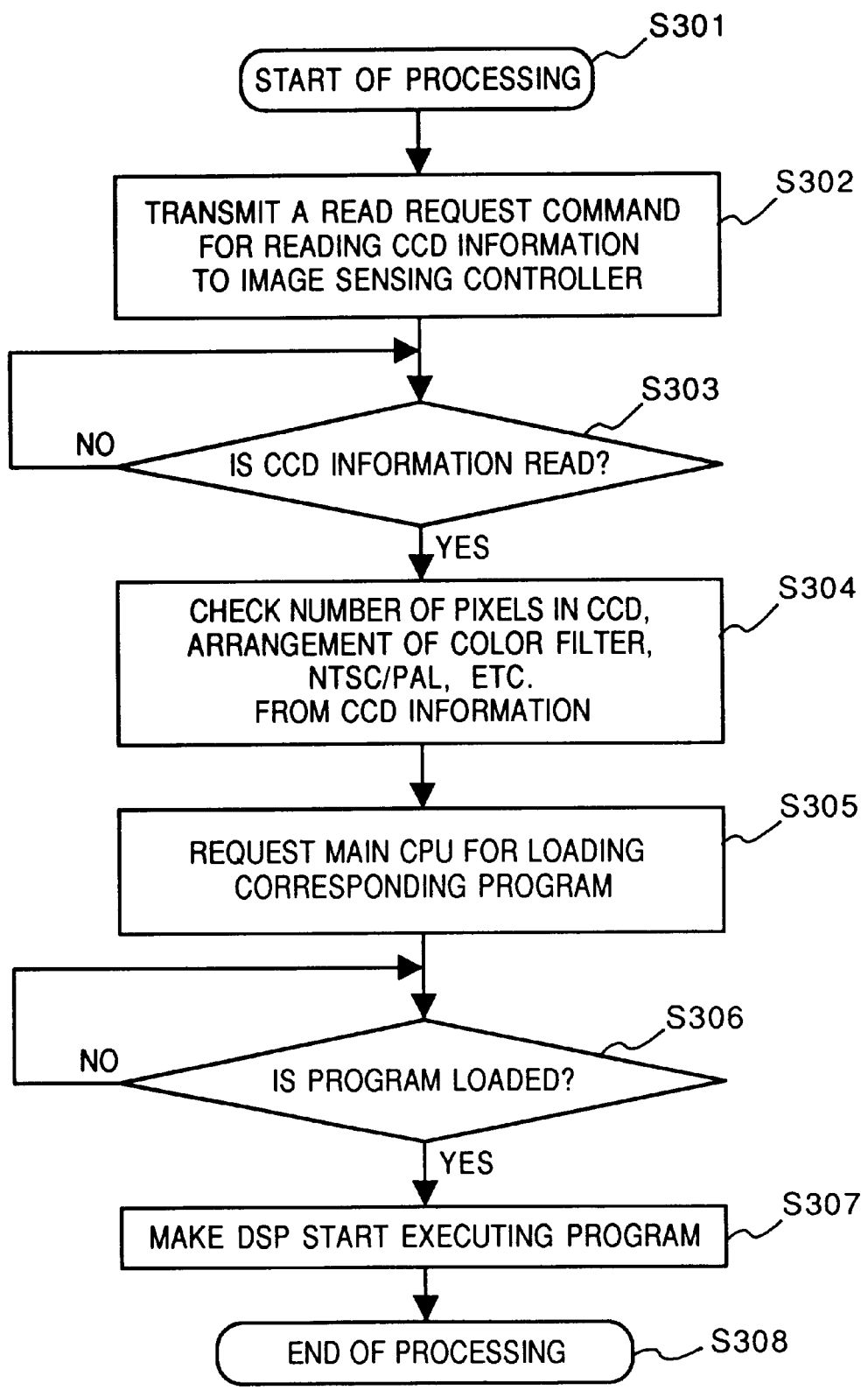
FIG. 3 is a flowchart showing a process of an operation of the image sensing apparatus according to the first modified example of the first embodiment.

An operation to change a signal processing at the DSP 201 when the image sensing unit 100 is changed to another unit, is described below referring to a flowchart of FIG. 3.

First, when a fact that the image sensing unit 100 is newly connected is detected by the bus controller 153, process starts at step S301. At S302, the bus controller 153 transmits a read request command for reading out CCD information to the image sensing controller 110 of the image sensing unit 100 through a serial communication line. The CCD information includes information as to the number of pixels in the CCD contained in the image sensing unit 100, color filter information, information indicating which, NTSC or PAL, method is selected, and the like. Upon reception of the command, the image sensing controller 110 which has a memory for storing these information in advance immediately sends back the CCD information to the bus controller 153 through the serial communication line.

The bus controller 153 waits to receive the CCD information at step S303, and after receiving the CCD information, the controller analyzes the CCD information at step S304, then outputs a request to the main CPU to load a signal processing program. This program is suitable for CCD 103 of the image sensing unit 100 which is connected to the signal processing board 140 at present (S305). This process is performed by interrupting operation of the main CPU by the bus controller 153 through the interruption line of the bus 155.

Practical load-down of program, program data is written by the main CPU, from time to time at addresses assigned to the image sensing apparatus of the first modification, thereby the bus controller 153 receives program data through the data bus of the bus 155, and transfers the data to a program memory area of the DSP 201 in order to store the data.

When the program is loaded, (YES, at step S306), then the process proceeds to step S307, where the bus controller 153 controls the DSP 201 to execute the loaded program. Thereby, process of the image signal sent from the image sensing unit 100 is started, and it becomes possible to store a video signal in the memory 156 and to output the video signal through an external output terminal. Further, when the signal processing board 140 and the image sensing unit 100 are electrically disconnected (which indicates that the image sensing unit 100 is disconnected from the board 140), operation of the DSP 201 is stopped. In order to restart the DSP 201, the aforesaid process is necessary.

In the first modification, the bus controller 153 detects a connection between the signal processing board 140 and the image sensing unit 100, and performs a loading of an application program, however, it is possible to make the main CPU perform these operations. In that case, the operation of the main CPU should be interrupted when the image sensing unit 100 is connected of the board 140, so that the main CPU can start reading CCD information and loading the program.

<Second Modification>

Figure 4:
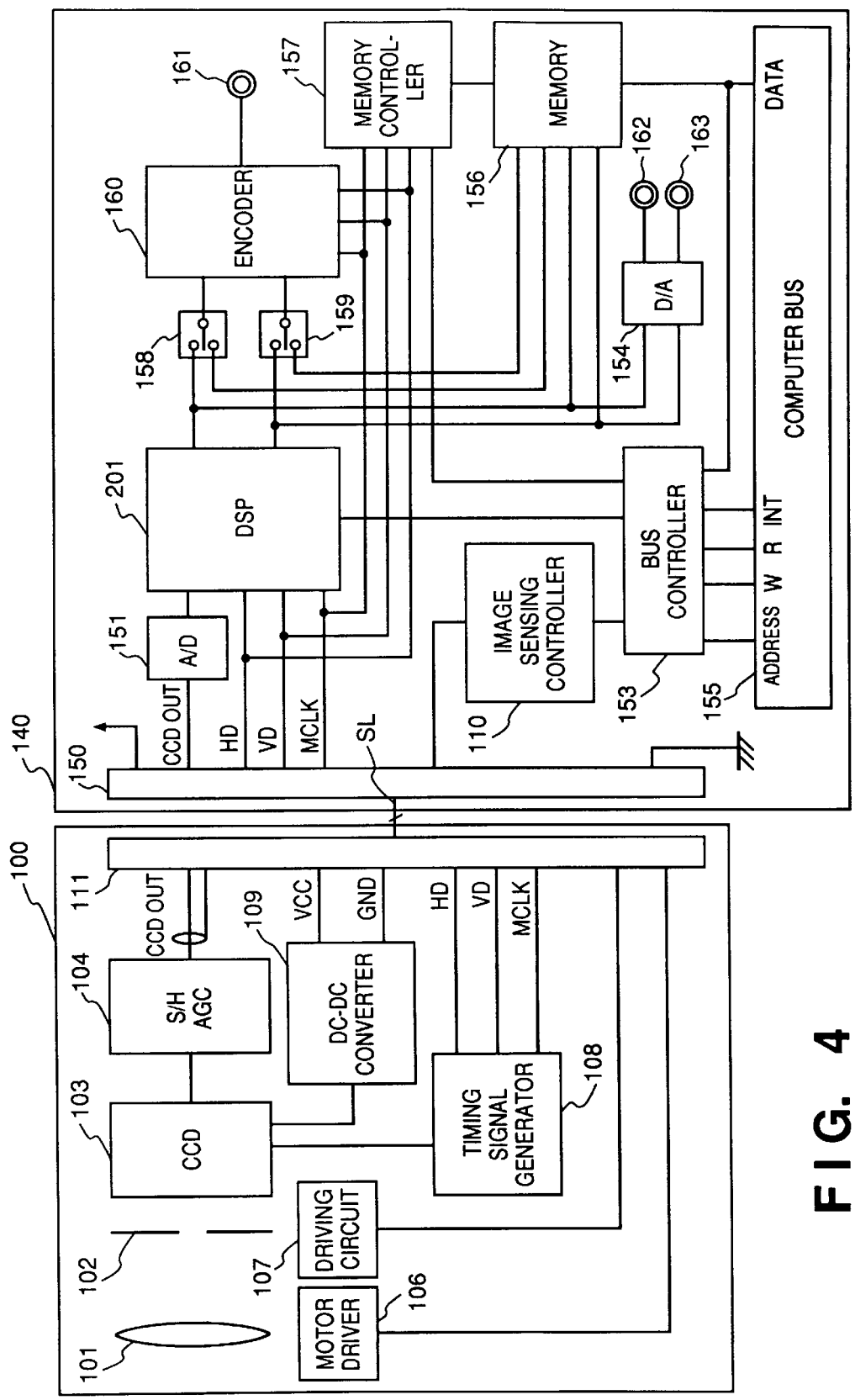
FIG. 4 is a block diagram illustrating a configuration of an image sensing apparatus according to a second modified example of the first embodiment.

FIG. 4 is a block diagram of an image sensing apparatus according to a second modification of the first embodiment, where the apparatus has the image sensing controller 110, which is located in the image sensing unit 100 in the first modification, in the signal processing board 140. The image sensing apparatus according to the second modification is able to directly control from the signal processing board, the motor driver 106 and the driving circuit 107 of the image sensing unit 100. In the image sensing apparatus according to the second modification, a plurality of terminal pins (not shown) for discrimination of CCD information are so provided between the connectors 111 and 150 so that ON/OFF information represented by the terminal pins can be changed by the image sensing unit 100 in accordance with the CCD information. This configuration enables the signal processing board 140 to discriminate the CCD information according to the ON/OFF information represented by the terminal pins, thus the program to be loaded in the DSP 201 can be selected.

Note that the image sensing unit 100 may contain a ROM for storing the CCD information so that the CCD information can be read out from the ROM.

According to the first embodiment and its modifications, the signal processing circuit can be image input means of a notebook type personal computer, or the like, if the signal processing circuit is provided on a PCMCIA (Personal Computer Memory Card International Association) card.

Accordingly, by providing the signal processing circuit on the PCMCIA card, it is possible for an apparatus such as a notebook type personal computer, which cannot attach a video capture board, or the like to obtain image input means easily and at low price.

As described above, by making it possible for the computer to control operations such as zooming operation and focusing, which are conventionally performed by a video camera, the image sensing apparatus according to the aforesaid first embodiment can reproduce a high resolution image signal with less deterioration by employing an inexpensive structure, and its various image sensing elements can be controlled by a computer easily. These effects can be obtained, as described above, by separating an image sensing unit from a signal processor, directly inputting an image signal from the CCD, which is obtained at the image sensing unit, into an expansion board contained in the computer, performing various signal processings in the expansion board of the computer for producing Y, R-Y, and B-Y signals, and communicating between the image sensing unit and the expansion board of the computer.

Further, the image sensing apparatus according to the aforesaid first embodiment is able to response to changes of arrangement of the color filters and changes of the number of pixels of a CCD in the image sensing unit, by changing the application program loaded in a DSP without changing the hardware of the signal processor. This is because signal processing conventionally performed by the expansion board contained in the computer have been changed to be performed by a DSP on which the program can be loaded.

<Second Embodiment>

A second embodiment of the present invention will be described below in detail.

Figure 5:
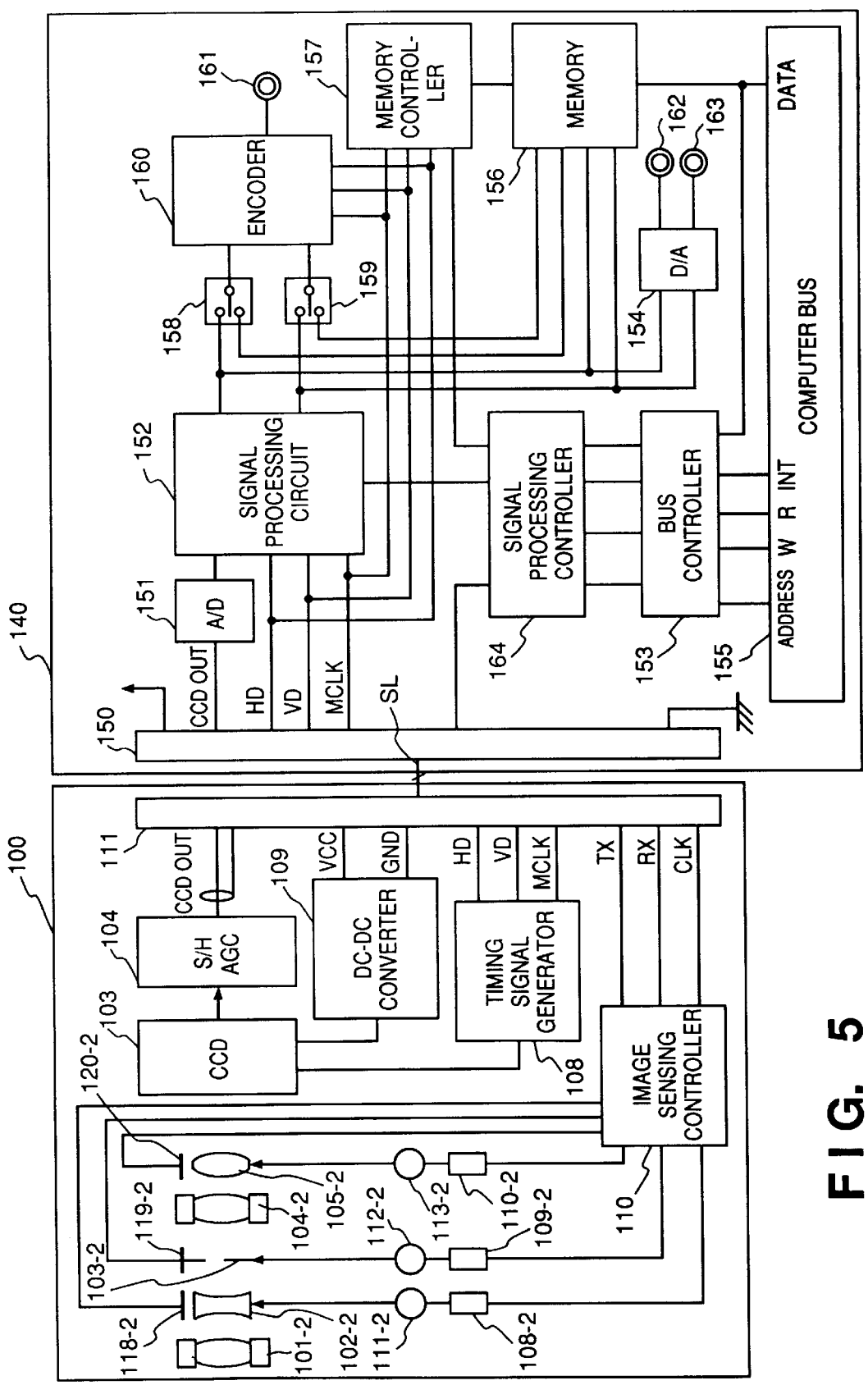
FIG. 5 is a block diagram illustrating a configuration of an image sensing apparatus according to a second embodiment of the present invention.

FIG. 5 is a block diagram illustrating a brief configuration of an image sensing apparatus according to the second embodiment of the present invention. In FIG. 5, the same reference numerals as in FIG. 1 denotes the same elements, devices, or the like. In FIG. 5, reference numeral 100 denotes an image sensing unit; 101-2, a fixed first group of lenses; 102-2, a zoom lens; 103-2, an iris diaphragm; 104-2, a fixed third group of lenses; and 105-2, a focusing lens having functions of correcting the movement of a focusing point in accordance with zooming and of focusing. Further, reference numeral 111-2 denotes a stepping motor; 108-2, a motor driver for driving the stepping motor 111-2; 113-2, a stepping motor for moving the focusing lens 105-2; 110-2, and a motor driver for driving the stepping motor 113-2.

Further, reference numeral 112-2 denotes an ig meter for controlling opening of the iris diaphragm 103-2; 109-2, a driving circuit for driving the ig meter 112-2; 118-2, a zoom encoder for detecting position information of the zoom lens 102-2; 119-2, an iris encoder for detecting a value of iris opening; and 120-2, a focus encoder for detecting position information of the focusing lens 105-2. The image sensing controller 110 finds the position information of the zoom lens and the focusing lens by using the zoom encoder 118-2 and the focus encoder 120-2, and drives the stepping motors 111-2 and 113-2 by controlling the motor drivers 108-2 and 110-2 in order to perform automatic focusing and a zooming operation on the basis of the position information, thus moving the zoom lens 102-2 and the focusing lens 105-2. Furthermore, reference numeral 103 denotes a CCD as image sensing means, and an image of an object is focused on a photo sensing surface of the CCD 103 by aforesaid groups of lenses.

Further, reference numeral 153 denotes a bus controller which controls communication between the bus 155 and a signal processing controller 164. The signal processing controller 164 communicates with all components on the signal processing board 140 and the bus 155, and exchanges serial data with the image sensing unit 100 through the connector 150, thereby controls the image sensing unit 100.

Figure 6:
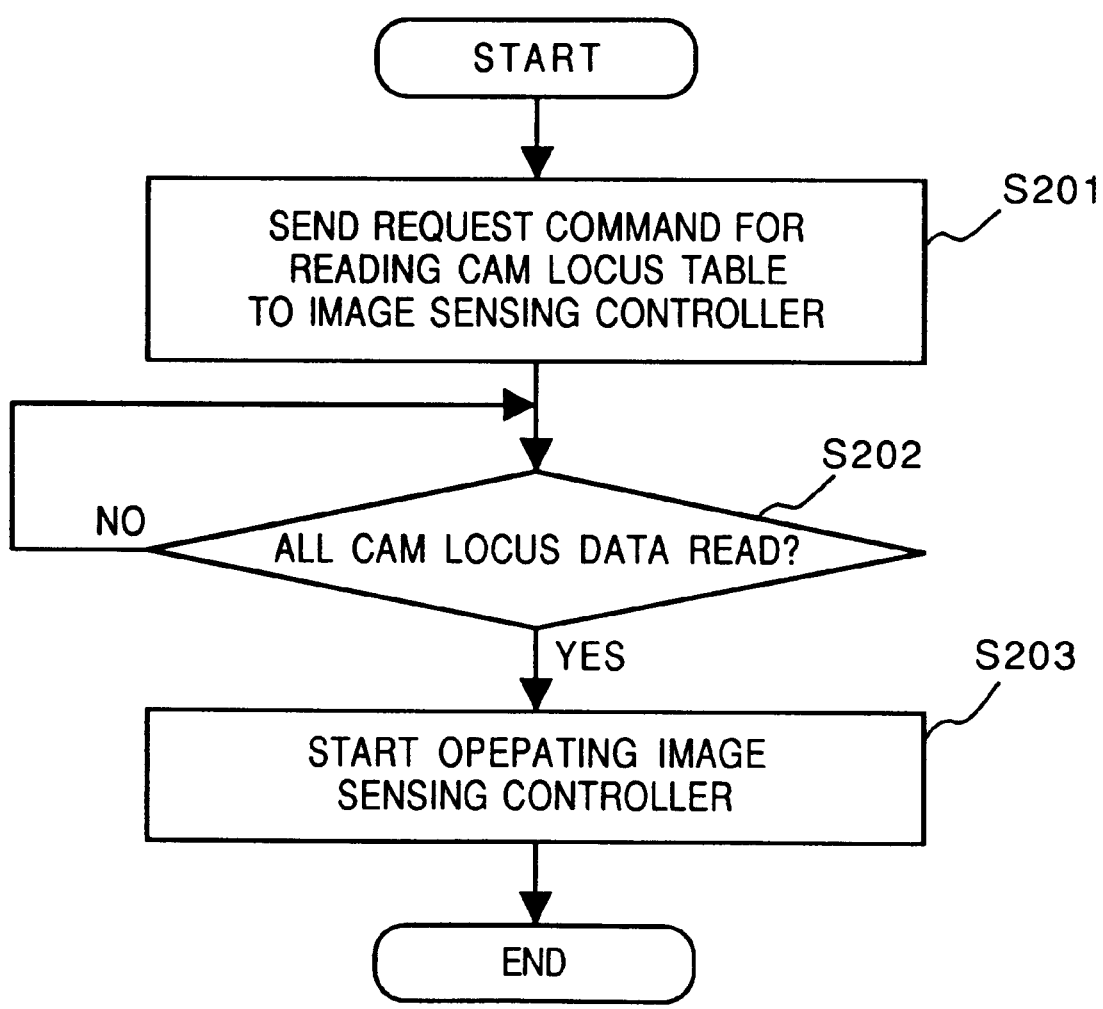
FIG. 6 is a flowchart showing an operation of the image sensing apparatus according to the second embodiment.

Next, an operation of the image sensing apparatus according to the second embodiment will be described referring to a flowchart of FIG. 6.

First, when power is turned on or when the image sensing unit 100 is detected as being it is newly connected, a signal processing controller 164 in FIG. 5 sends a request command for reading a cam locus table to the image sensing controller 110 in order to load the cam locus table, which contains cam locus data inherent to the groups of lenses of the image sensing unit, into a memory of the signal processing controller 164 at step S201. The image sensing controller 110 has a memory for storing these data, and when the controller receives the aforesaid request command, it sends the cam locus table to the signal processing controller 164 by using serial communication. The signal processing unit 164 reads the entire data in the cam locus table and stores it in a memory of the signal processing unit 164 at step S202.

As described above, when the cam locus table is completely loaded, the controller sends a request for initializing the image sensing unit 100, then the image sensing unit 100 is operated at step S203. Accordingly, processing of an image signal sent from the image sensing unit 100 is started.

After the aforesaid process, when the application program in the computer is executed to send a command for zooming to the signal processing controller 164 via the computer bus 155, the signal processing unit 164 extracts the distinction of the image of the object on the display from the image signal sent from the image sensing unit 100 to the signal processing circuit 152. Then, the signal processing unit 164 sends operational information of the groups of lenses to the image sensing controller 110, the information is determined by the distinction of the image and the cam locus table loaded in the memory of the signal processing controller 164. The signal controller 110 controls the operations of the zoom lens 102-2 and the focusing lens 105-2 in accordance with the operational information.

As described above, it is possible to control various kinds of image sensing units having different cam loci to perform the most suitable focusing and zooming operation.

Further, in the image sensing apparatus according to the second embodiment, similarly to the first embodiment, when the signal processing board 140 and the image sensing unit 100 are electrically disconnected (when the image sensing unit is disconnected), the signal processing controller 164 stops signal processing in the signal processing board, and in order to restart, the processing the same process as described above is followed.

<First Modification>

A modification of the aforesaid second embodiment will be described below. The configuration of the image sensing apparatus according to the first modification is the same as in the second embodiment, thus the explanation of elements, devices, or the like, is omitted.

Figure 7:
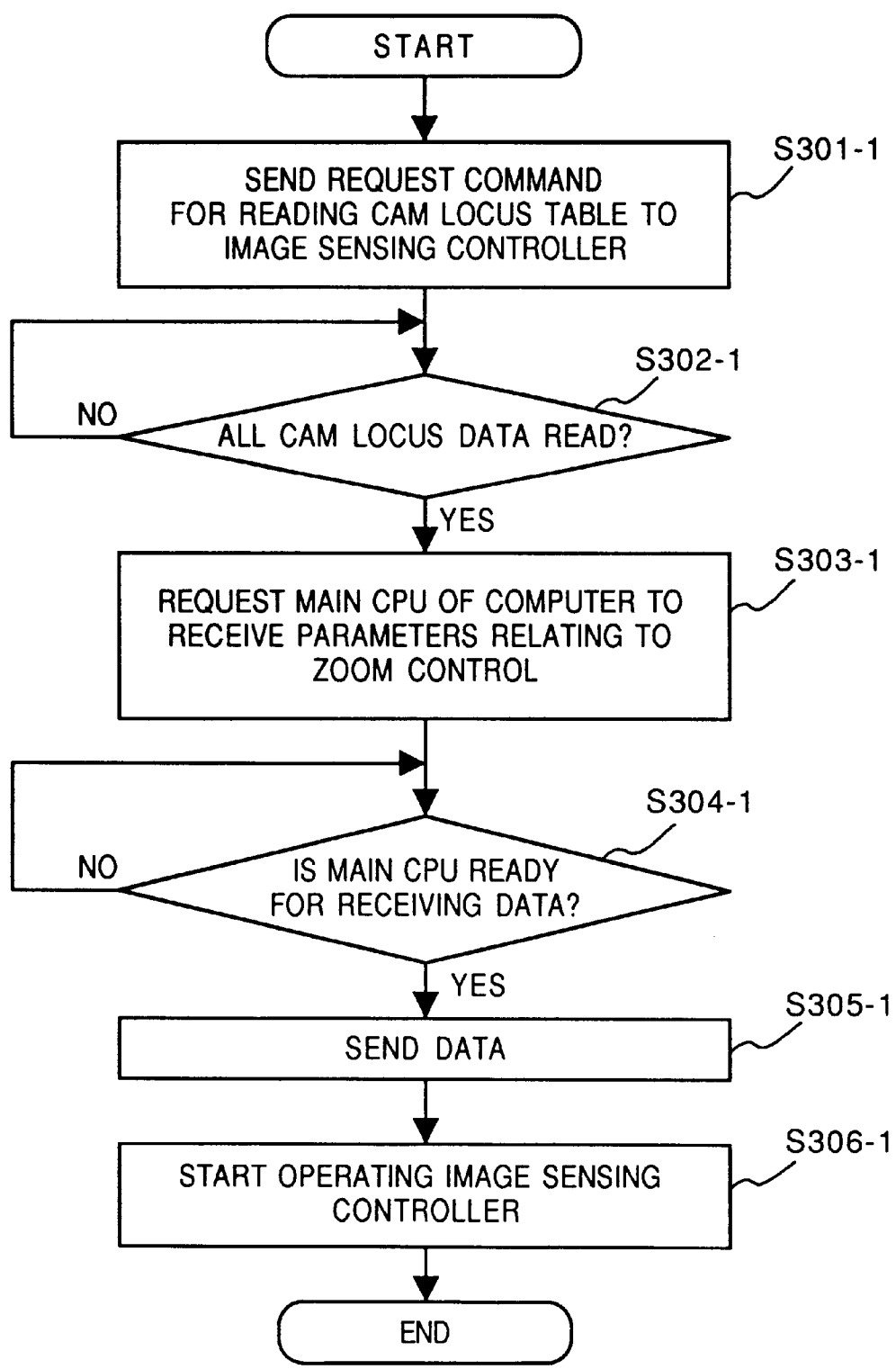
FIG. 7 is a flowchart showing a process of an operation of an image sensing apparatus according to a first modified example of the second embodiment.

FIG. 7 is a flowchart showing an operation of the image sensing apparatus according to the first modification of the second embodiment.

In the first modification, when power is turned on, or when the image sensing unit 100 is detected as being newly connected, the signal processing controller 164 sends a request command for reading the cam locus table to the image sensing controller 110 in order to load such parameters as the cam locus table which contains cam locus data inherent to the groups of lenses of the image sensing unit 100, speed information such as fastest operation speed of the zoom lens and the focusing lens, distance between the wide end to the tele-end of the zoom lens and its step amount, and distance between the closest and the farthest focal length and step amount of the focusing lens, to a memory of the signal processing controller 164 at step S301-1.

The image sensing controller 110 has a memory for storing these data in advance, and when the image sensing controller 110 receives the aforesaid command, it transmits these data to the signal processing controller 164 by using serial communication. Then, the signal processing controller 164 stores the entire data in its memory at step S302-1.

Next, the signal processing controller 164 issues a transmission request command against the main CPU of a computer in order to send these data to the CPU through the bus 155 at step S303-1. Then the signal processing controller 164 waits until the main CPU is ready for receiving the data at step S304-1. When the main CPU is ready to receive data, the signal processing controller 164 starts sending the data at step S305-1.

After sending all the data to the main CPU, the signal processing controller 164 drives the image sensing unit 100 at step S306-1, and starts processing an image signal sent from the image sensing unit 100. The subsequent operation is the same as that in the second embodiment, thus the explanation of it is omitted.

In the first modification of the second embodiment as described above, it is possible for the image sensing unit 100 having different cam loci to perform the most suitable focusing and zooming operations. After same time, the computer can perform most suitable control of the image sensing unit 100 in accordance with an application program, since the computer is aware of the control parameters of the groups of lenses of the image sensing unit 100 with the aid of the data sent from the signal processing controller 164.

It should be noted that, after the signal processing board 140 and the image sensing unit 100 are electrically disconnected (when the image sensing unit is disconnected), the same process as in the second embodiment is followed.

<Second Modification>

Figure 8:
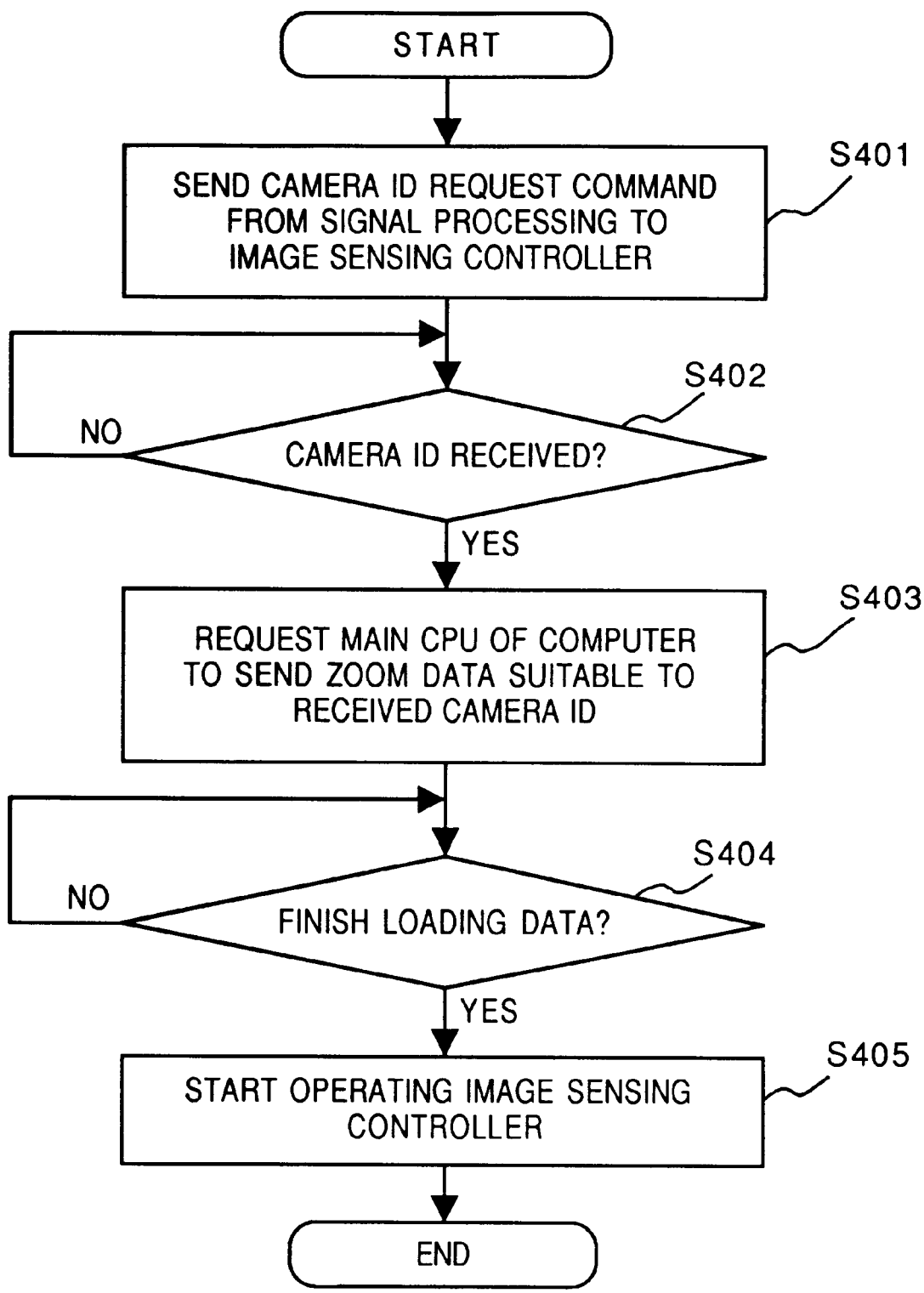
FIG. 8 is a flowchart showing a process of an operation of an image sensing apparatus according to a second modified example of the second embodiment.

FIG. 8 is a flowchart showing an operation of an image sensing apparatus according to the second modification of the second embodiment.

In the second modification, when power is turned on, or when the image sensing unit 100 is detected as being newly connected, the signal processing controller 164 sends an ID request command to the image sensing controller 110, in order to read the ID possessed by the image sensing unit 100, at step S401. The image sensing controller 110 has a built-in memory for storing the ID, and when the controller receives the aforesaid command, it sends the ID to the signal processing controller 164 by using serial communication.

The signal processing controller 164 waits until the image sensing controller 110 finishes reading the ID at step S402, and when the image sensing controller 110 has finished it, the controller sends a request command for sending the data to the main CPU of a computer, in order to load such parameters relating to zooming and focusing as the cam locus table, speed information such as fastest operation speed of the zoom lens and the focusing lens, distance between the wide-end and the tele-end of the zoom lens and its step amount, and distance between the closest and the farthest focal length and step amount of the focusing lens, all of which are suitable to the ID, to a memory of the signal processing controller 164 at step S403.

The computer stores these the data in a storage medium, such as a hard disc and a floppy disk (not shown), and selects the data corresponding to the ID, then sends it to the signal processing controller 164. The signal processing controller 164 reads the entire data sent from the main CPU, and stores it in the memory of the signal processing controller 164 at step S404. When the signal processing controller 164 has finished loading all the data from the main CPU, the controller transmits a request for initializing the image sensing unit 100, instructs the image sensing unit to work at step S405, and starts processing image signals sent by the image sensing unit 100.

The subsequent operation is the same as that in the second embodiment, thus the explanation of it is omitted.

According to the second modification of the second embodiment as described above, since the data, such as cam loci suitable for the groups of lenses in the image sensing unit 100, is provided from the main CPU, the data as parameters can be freely changed by an application program of the computer.

Further, in the image sensing apparatus according to the second modification, similarly to the first embodiment, when the signal processing board 140 and the image sensing unit 100 are electrically disconnected (when the image sensing unit is disconnected), the signal processing controller 164 stops signal processing in the signal processing board, and in order to restart the processing, the same process as described above is followed.

<Third Modification>

Figure 9:
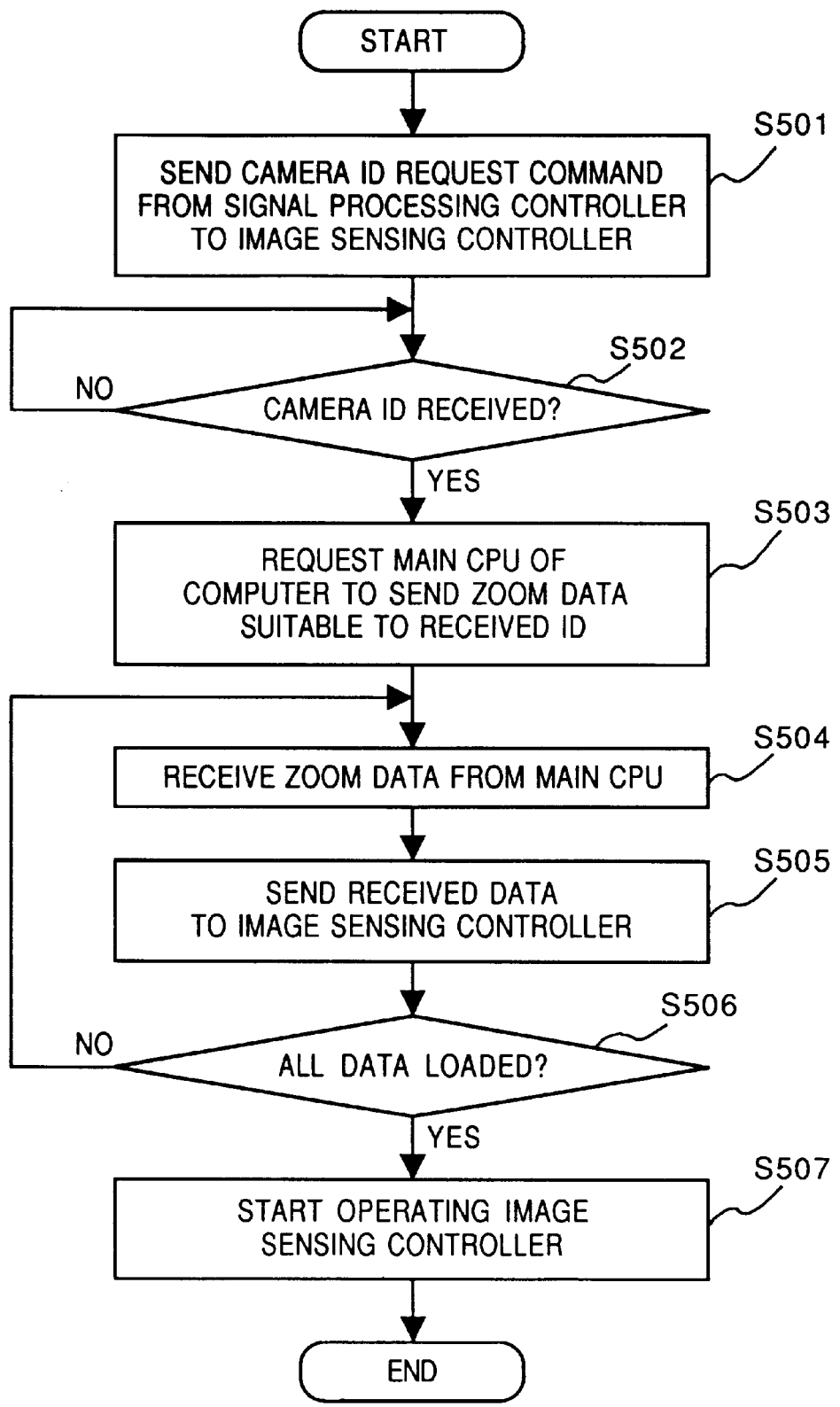
FIG. 9 is a flowchart showing a process of an operation of an image sensing apparatus according to a third modified example of the second embodiment.

FIG. 9 is a flowchart showing an operation of an image sensing apparatus according to a third modification of the second embodiment.

In the third modification, when power is turned on, or when the image sensing unit 100 is detected as being it is newly connected, the signal processing controller 164 sends an ID request command to the image sensing controller 110, in order to read the ID possessed by the image sensing unit 100, at step S501. The image sensing controller 110 has a built-in memory for storing the ID, and when the controller receives the aforesaid command, it sends the ID to the signal processing controller 164 by using serial communication.

The signal processing controller 164 waits until the image sensing controller 110 finishes reading the ID at step S502, and when the image sensing controller 110 has finished it, the controller sends a request command for sending the data to the main CPU of a computer, in order to load such parameters relating to zooming and focusing as the cam locus table, speed information, such as fastest operation speed of the zoom lens and the focusing lens, distance between the wide-end and the tele-end of the zoom lens and its step amount, and distance between the closest and the farthest focal length and step amount of the focusing lens, all of which is most suitable to the ID, to a memory of the signal processing controller 164 at step S503.

The computer stores these data in a storage medium, such as a hard disc and a floppy disk (not shown), and selects the data corresponding to the ID, then sends it to the signal processing controller 164 at step S504. The signal processing controller 164 sends the data received from the main CPU to the image sensing controller 110 at step S505. Note that the image sensing controller 110 has a memory for storing the data.

The signal processing controller 164 repeats the processes of steps S504 and S505 until all the data from the main CPU is loaded. When all the data from the main CPU is loaded (YES, at step S506), the signal processing controller 164 issues a request for initializing the image sensing unit 100, puts the image sensing unit 100 to work at step S507, and starts processing image signals sent by the image sensing unit 100.

After this, when a zoom request command is sent to the signal processing controller 164 via the bus 155 in accordance with the application program of the computer, the signal processing controller 164 sends the zoom request command to the image sensing controller 110, as well as extracts distinction of the image of the object from the image signal which is sent from the image sensing unit 110 to the signal processing circuit 152, and sends result of the extraction to the image sensing controller 110.

The image sensing controller 110 controls operations of the zoom lens 102-2 and the focusing lens 105-2 in accordance with calculation based on the data and the cam locus table loaded in the memory.

According to the third modification of the second embodiment as described above, since data such as cam loci suitable for the groups of lenses in the image sensing unit 100, is provided from the main CPU, the data as parameters can be freely changed by an application program of the computer.

Further, in the image sensing apparatus according to the third modification, an operation when the signal processing board 140 and the image sensing unit 100 are electrically disconnected (when the image sensing unit 100 is disconnected) is similar to that of the first embodiment.

<Fourth Modification>

Figure 10:
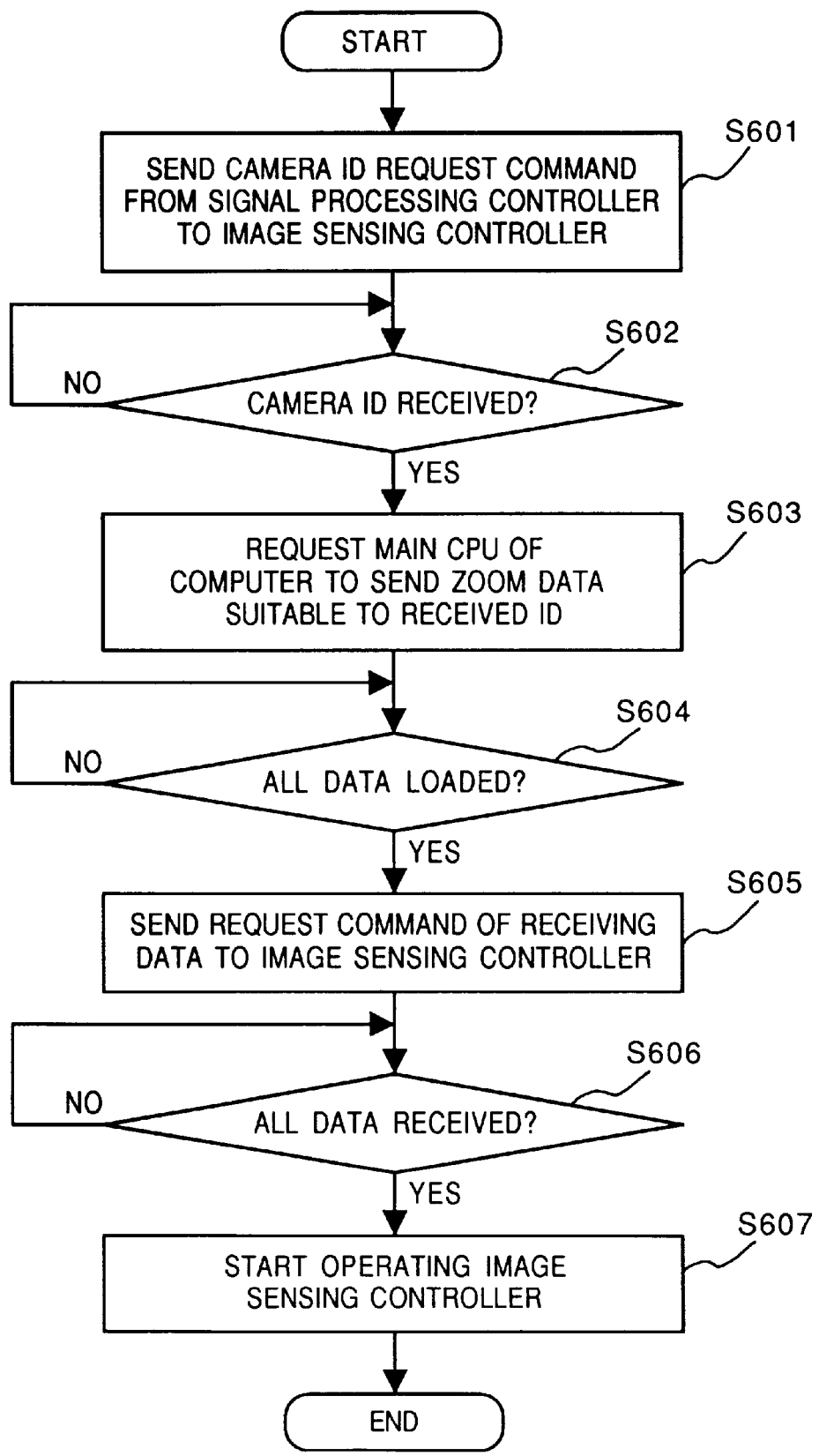
FIG. 10 is a flowchart showing a process of an operation of an image sensing apparatus according to a fourth modified example of the second embodiment.
Figure 11:
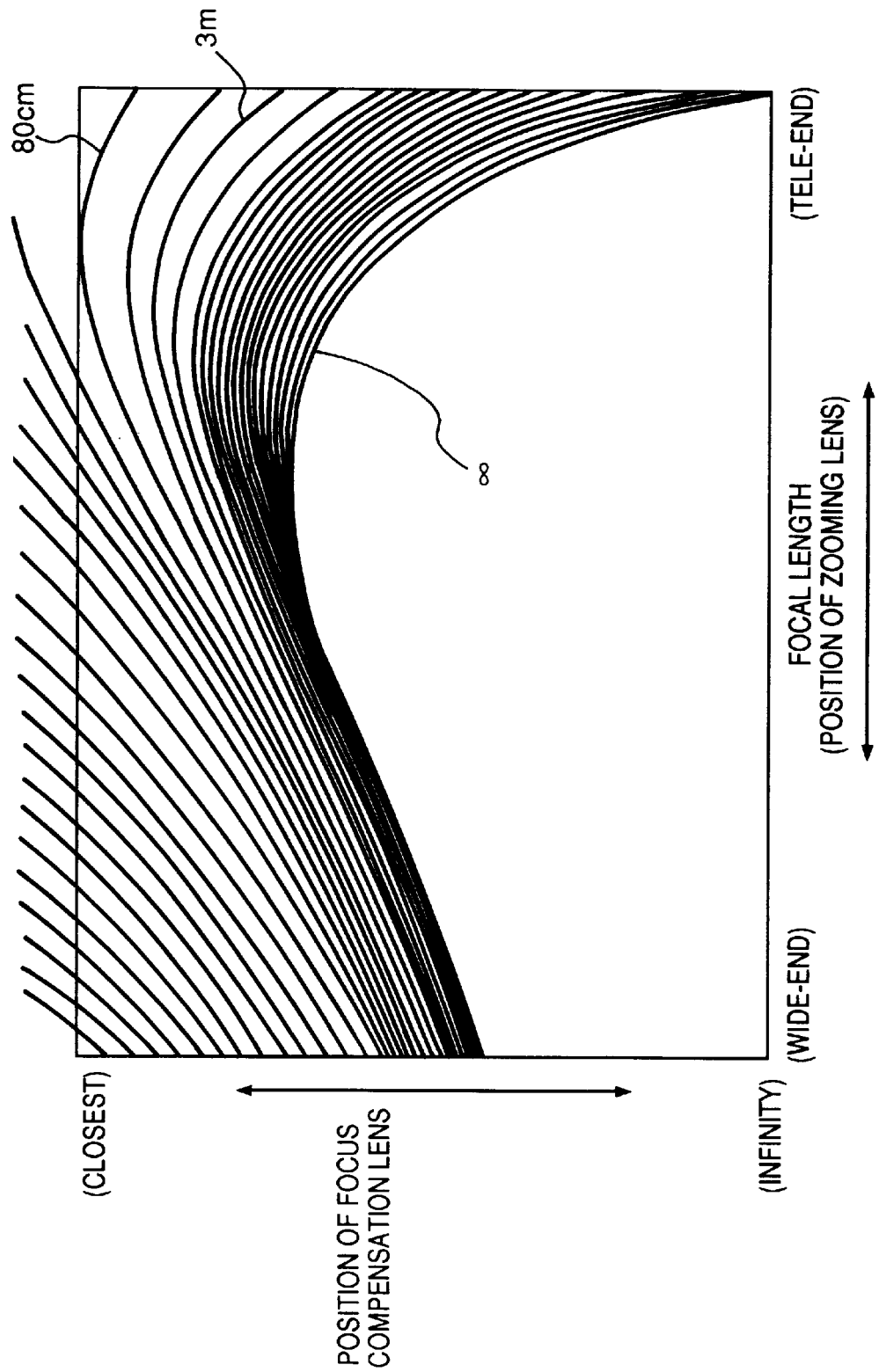
FIG. 11 shows examples of graphs of cam loci.

FIG. 10 is a flowchart showing an operation of an image sensing apparatus according to a fourth modification of the second embodiment.

In the fourth modification, when power is turned on, or when the image sensing unit 100 is detected as being newly connected, the signal processing controller 164 sends an ID request command to the image sensing controller 110, in order to read the ID possessed by the image sensing unit 100 at step S601. The image sensing controller 110 has a built-in memory for storing the ID, and when the controller receives the aforesaid command, it sends the ID to the signal processing controller 164 by using serial communication.

The signal processing controller 164 waits until the image sensing controller 110 finishes reading the ID at step S602, and when the image sensing controller 110 has finished it, the controller sends a request command for sending the data to the main CPU of a computer, in order to load such parameters relating to zooming and focusing as the cam locus table, speed information such as fastest operation speed of the zoom lens and the focusing lens, distance between the wide-end and the tele-end of the zoom lens and its step amount, and distance between the closest and the farthest focal length and step amount of the focusing lens all of which are suitable to the ID, to a memory of the signal processing controller 164 at step S603.

The computer stores these data in a storage medium, such as a hard disc and a floppy disk (not shown), and selects the data corresponding to the ID, then sends it to the signal processing controller 164. The signal processing controller 164 has a built-in memory for storing the data.

When all the data is loaded (YES, at step S604), the signal processing controller 164 sends a request command for receiving data to the image sensing controller 110 in order to send the received data to the image sensing controller 110 at step S605. The image sensing controller 110 also has a built-in memory for storing these data.

When the image sensing controller 110 received the aforesaid command, it waits until the signal processing controller 164 sends data. When the signal processing controller 164 sends all the received data to the image sensing controller 110 (YES, at step S606), it issues a request for initializing the image sensing unit 100, puts the image sensing unit 100 to work at step S607, and starts processing an image signal sent from the image sensing unit 110.

It should be noted that the aforesaid series of operations in the fourth modification correspond to a case in which deterioration of computer performance is prevented by reducing the occupied time period of the computer bus 155 when large amount of data is exchanged in the third modification.

Further the subsequent operation is the same as that in the third modification, thus the explanation of it is omitted.

In the fourth embodiment as described above, since the computer knows the control parameters of the groups of lenses of the image sensing unit 100, it is possible for the computer to perform control which is most suitable to the image sensing unit 100, by using the application program of the computer. It is also possible for the computer to freely change these parameters by using an application program of the computer, since data such as cam loci suitable for the groups of lenses in the image sensing unit 100 is provided by the main CPU.

Further, in the image sensing apparatus according to the fourth modification, an operation when the signal processing board 140 and the image sensing unit 100 are electrically reconnected (when the image sensing unit 100 is reconnected) is similar to that of the first embodiment. It should be noted that the apparatus according to the second embodiment may store in a memory such parameters as sensitive information of image sensing devices in a camera unit, data relating to a kind of color filter, its spectrum characteristics and its array, the number of picture elements that the image sensing devices have, the number of the image sensing devices, again, characteristics of non-linearity, operational characteristics of an iris, shutter and other optical elements, and then transmit these parameters to a signal processing unit. This configuration optimizes characteristics of a signal processing and its control.

As described above, it is possible to perform the most suitable control for the exchangeable camera head unit by generating control information for the lenses dependent upon the data from a camera head unit.

Further, by connecting a computer to an image signal processing unit, which is separated from the camera head unit, it is possible to control the camera head unit easily from the computer.

<Third Embodiment>

A third embodiment of the present invention will be described below.

Figure 12B:
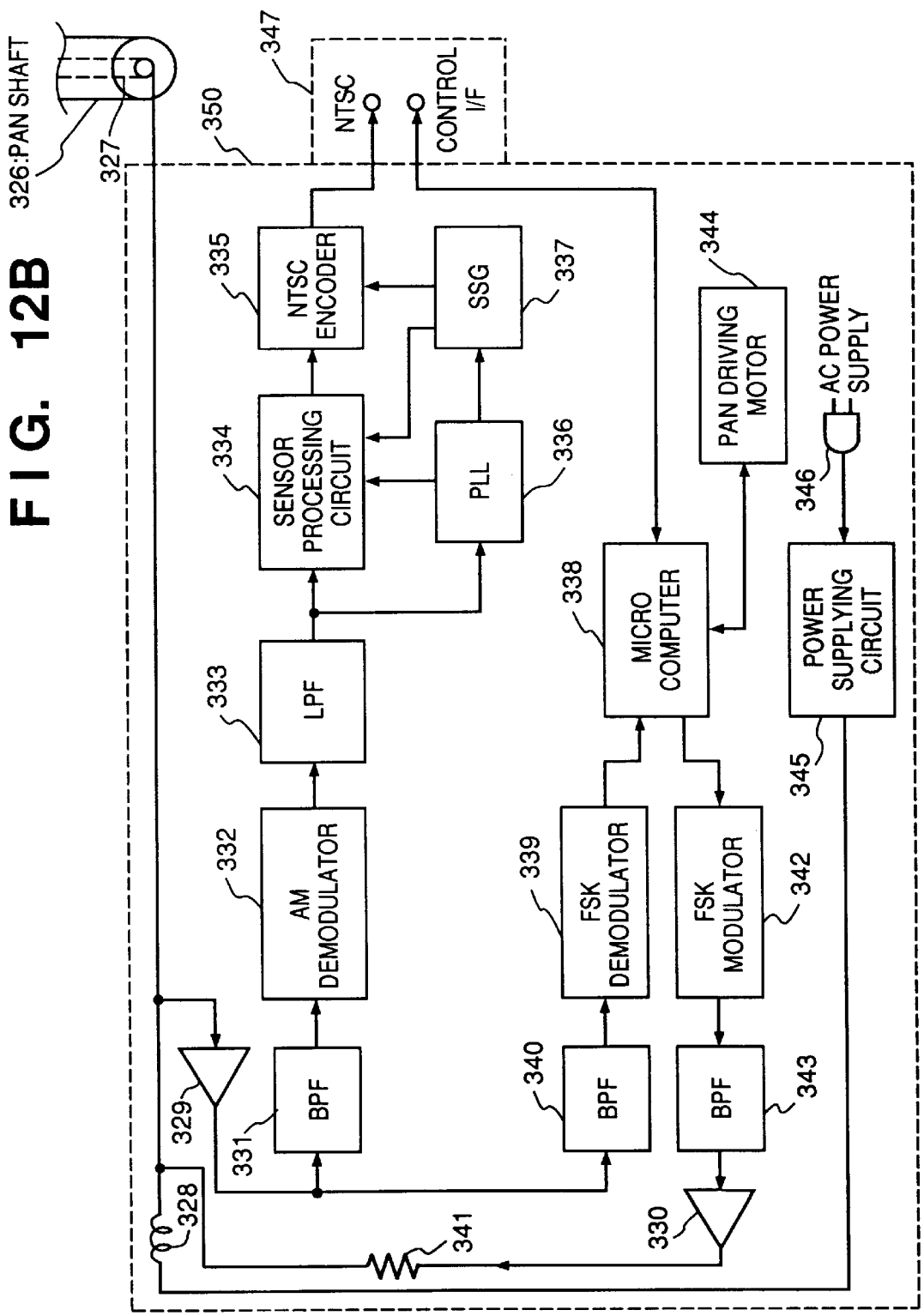

FIGS. 12A and 12B is a block diagram of the electrical configuration of a tiltable pan head video camera system according to the third embodiment of the resent invention. In FIG. 12A, reference numeral 348 denotes a video camera head; 349, a modulation/demodulation circuit block on a rotatable stage of a pan head; and in FIG. 12B, reference numeral 350 denotes a modulation/demodulation circuit block on a base. Further, reference numeral 301 denotes an image sensor, e.g., a CCD; 302, a sample/hold and AGC circuit; 303, an encoder for converting a signal to a signal with a predetermined format; 304, driver for the image sensor 301; 305, a timing signal generator for generating various kinds of timing pulses necessary for driving the image sensor 301; 306, a synchronizing signal generator (SSG); and 307, a microcomputer.

Further, reference numeral 308 denotes external input/output terminals of the video camera head; 309, a connecting cable; 310, connecting terminals of a video camera in a rotatable stage of the pan head; 311, an AM modulator; 312, a band pass filter (BPF); 313, a microcomputer; 314, an FSK modulator; 315, a band pass filter (BPF); 316, an adder; 317, an FSK demodulator; 318, a band pass filter (BPF); and 319 and 320, buffer amplifiers.

Further, reference numeral 321 denotes tilt driving motor; 322, a DC—DC converter; 323, a low pass filter (LPF); 324, a capacitor for impending a DC current; 325, an output matching resistor; 326, a pan shaft which forms an external conductor of a signal-color type coaxial construction; and 327, a core cable forming a central conductor of the signal-core type coaxial construction.

Reference numeral 328 denotes an inductor; 329 and 330, buffer amplifiers; 331, a band pass filter; 332, an AM demodulator; 333, a low pass filter (LPF); 334, a sensor processing circuit; 335, an NTSC encoder; 336, a phase-locked loop circuit (PLL); and 337, a synchronizing signal generator (SSG).

Further, reference numeral 338 denotes a microcomputer; 339, an FSK demodulator; 340, a band pass filter (BPF); 341, an output matching resistor; 342, an FSK modulator; 343, a band pass filter; 344, a pan driving motor; 345, a power supplying circuit; 346, an AC plug; and 347, external input/output terminals on the base.

Figure 13:
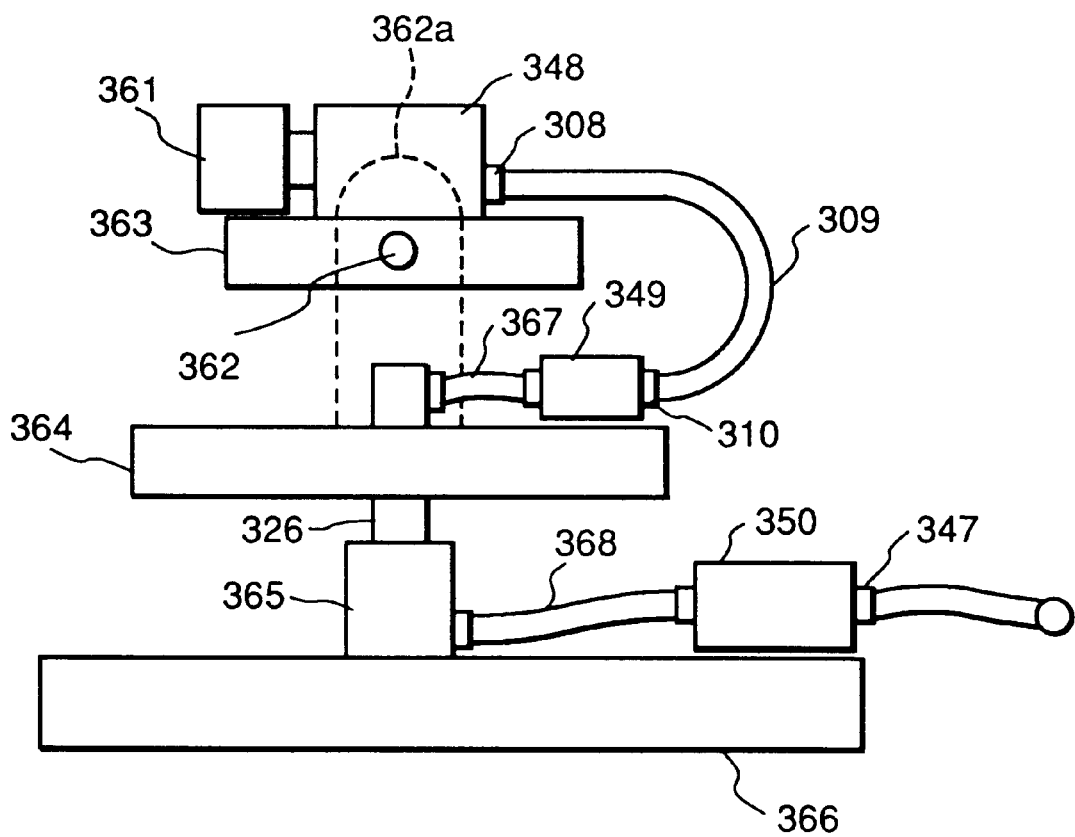
FIG. 13 is a view of a tiltable pan head seen from a side.

FIG. 13 illustrates side view showing a configuration of a tiltable pan head according to the third embodiment. It should be noted that elements, devices, or the like, which are not directly related to the present invention are not shown in the figure.

In FIG. 13, reference numeral 361 denotes an object lens; 362, a tilt rotational shaft; 362a, a tilt shaft holder; 363, a tilt base; 364, a pan head; 365, a pan shaft holder; 366, a base; and 367 and 368, connecting cables. Note that, in FIG. 13, the same reference numerals as in FIG. 12 denote the same elements, devices or the like, and the explanation of them are omitted.

Next, an operation according to the third embodiment will be explained with reference to FIGS. 12 and 13.

When an AC power is supplied to the power supplying circuit 345 via the AC plug 346 of the modulation/demodulation circuit block 350 on the base 366, a predetermined DC voltage is applied to the entire circuit block 350, as well as to the core cable 327 of the pan head 326 via the inductor 328. The DC voltage is also applied to the circuit block 349 of the pan head 364 via the core cable 327, where noises on the DC current are eliminated by passing the current through the low pass filter 323. The DC voltage is then converted to a desired DC voltage by the DC—DC converter 322.

The DC voltage puts electrical circuits of the circuit block 349 to work and is applied to connecting terminals of the video camera 310 and further provided to the video camera head 348 via the connecting cable 309, thus turning on the video camera 348. The microcomputer 307 of the video camera 348 performs predetermined initialization after the power is turned on, thereby the video camera starts functioning.

An image focused by the object lens 361 in FIG. 13 induces prescribed amount of electrical charge on each pixel of the image sensor 301 which consists of, e.g., a CCD, and the electrical charge on each pixel is detected by the sensor 301 as a voltage information. The voltage information is processed by a sample and hold method at the sample/hold and AGC circuit 302, in accordance with a predetermined sampling signal, thereby a desired image information is extracted.

Immediately after, a signal having the extracted information passes through an automatic gain control amplifier (AGC) where the signal is adjusted to have a predetermined amplitude level, then the signal is sent to the encoder 303. After processed at the AGC, the encoder 303 encodes the image information (referred as "video information", hereinafter) into a signal having a format of video signal output as shown in FIG. 14.

Figure 14:
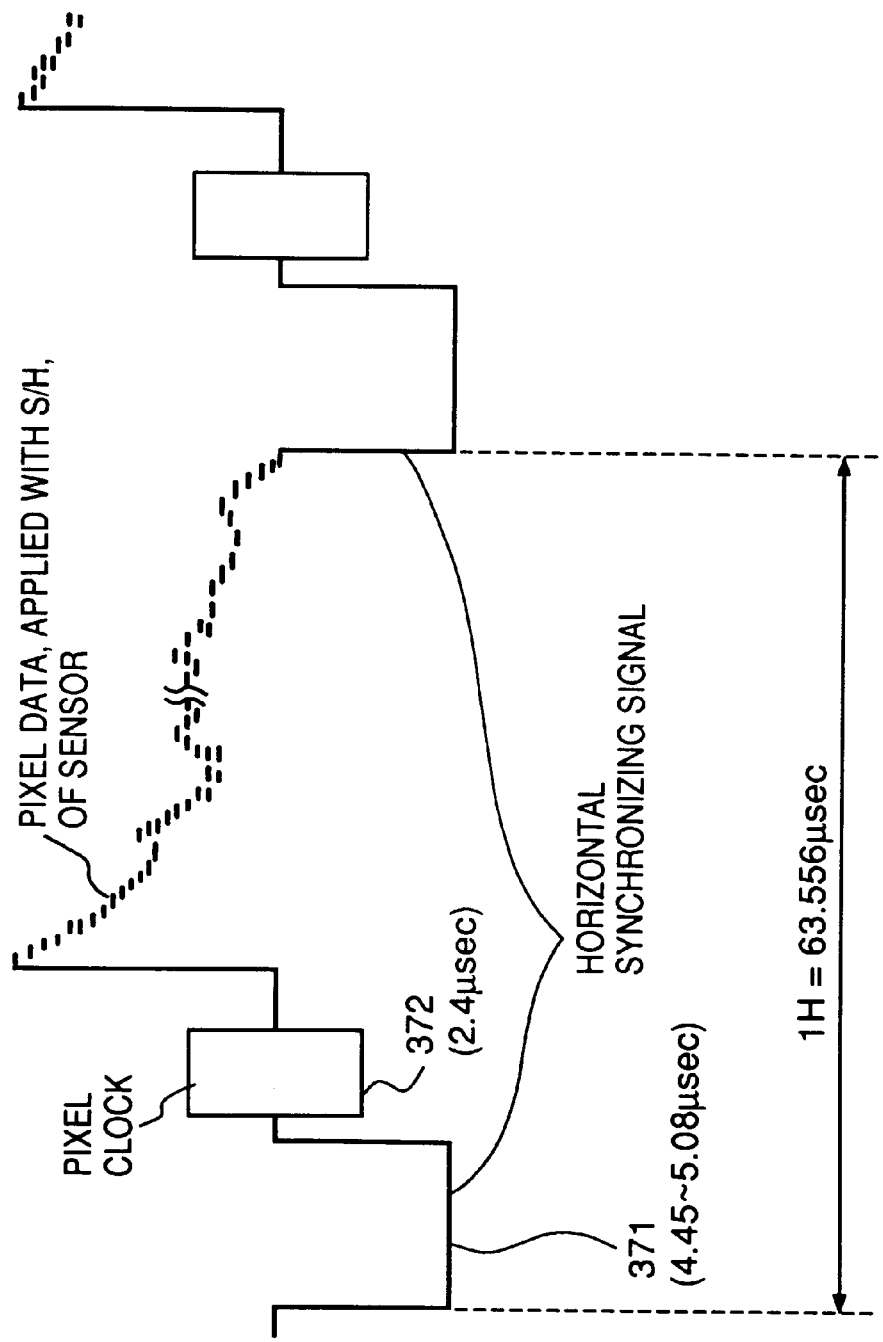
FIG. 14 is a graph of output shape of a video signal.

In FIG. 14, reference numeral 371 denotes a horizontal synchronizing signal equivalent to a signal in the NTSC method, lasting about 5 $\mu$sec; 372, an area for a color burst signal which can contain about 8 to 12 cycles of color sub-carrier signals of 3.58 MHz in the NTSC method, however, in the third embodiment instead of these sub-carrier signals, a pixel clock lasting 2.4 μsec for horizontal reading of the sensor 301 is inserted. It should be noted that a vertical synchronizing signal and an equalizing pulse are the same as those in the NTSC method.

Figure 15:
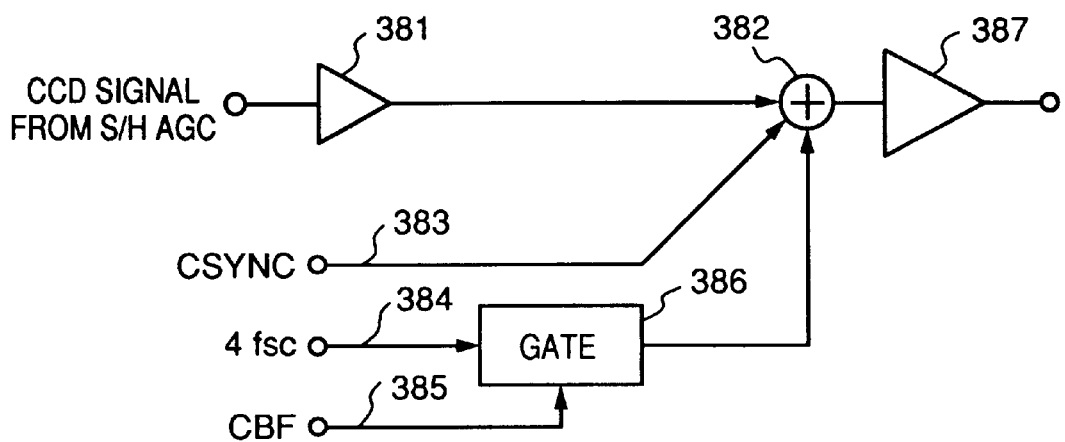
FIG. 15 illustrates a configuration of an encoder.

FIG. 15 is a diagram illustrating the configuration of the encoder 303, in FIG. 15, reference numeral 381 denotes a buffer amplifier; 382, an adder; and 387, a video amplifier. Inputted video information is sent to the adder 382 after passing through the buffer amplifier 381. Whereas, regarding a composite synchronizing signal 383 generated by the synchronizing signal generator, a pixel clock 384 (if a CCD sensor has 405 pixels, it is 4 fsc, where 2.12 fsc is 3.58 MHz of the color sub-carrier signal), and a color burst flag (CBF) 385, the composite synchronizing signal 383 is directly sent to the adder 392, while the pixel clock is selected during a period determined by the color burst flag (CBF) 385 at a gate circuit 386, and the selected clock is sent to the adder 382.

Thereby a video signal shown in FIG. 14, is obtained as an output signal from the adder 382, and that signal is outputted through the video amplifier 387.

Figure 16:
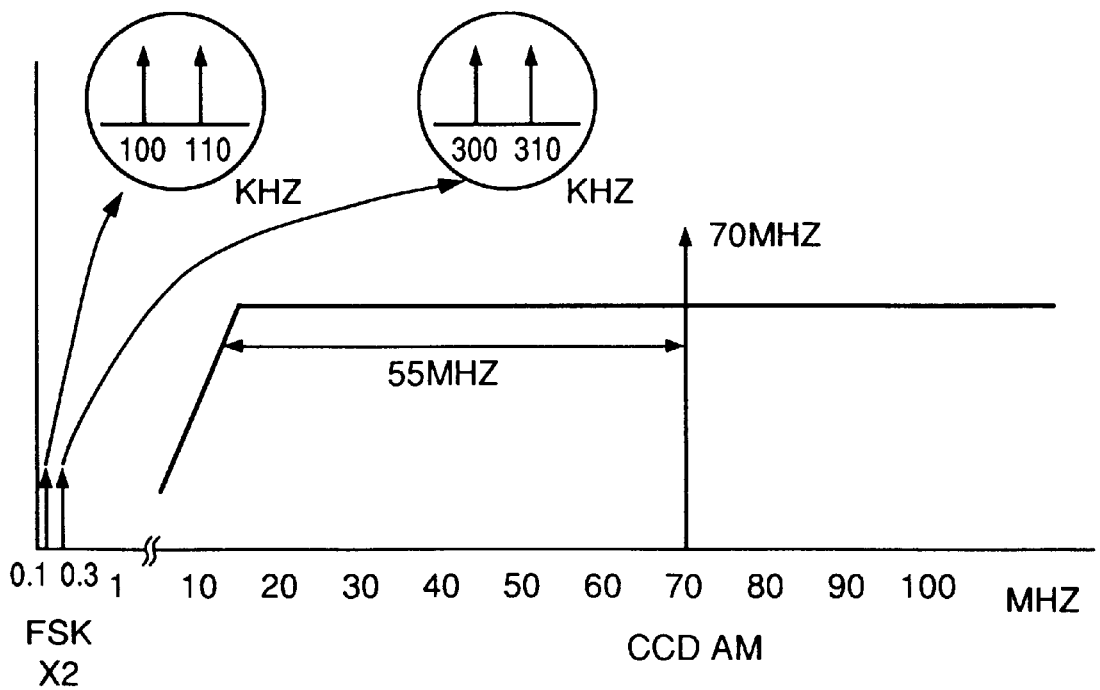
FIG. 16 is a graph showing the spectrum of a FSK signal.

The video signal having the form shown in FIG. 14 at the encoder 303 is sent to the modulate/demodulate circuit block 349 on the pan head 364, via the external input/output terminals 308 and the connecting cable 309. In the circuit block 349, the video signal is amplitude modulated of a carrier signal of, e.g., 70 MHz as shown in FIG. 16, which shows characteristics of a frequency arrangement of the amplitude modulation. The reason for using a high frequency of carrier signal, namely 70 MHz, is as follows, by off-setting the signal level effected by an arrangement of on-chip color filter on the sensor, it is necessary to expect a bandwidth of ten times as wide as the ordinary video signal of 5.5 MHz (band width for 4 mega pixels), namely 55 MHz.

It should be noted that FIG. 16 contains the spectrum of an FSK signal, however, the signal is used for controlling the tilt driving motor 321 and the video camera 348, which is not directly related to the present invention, thus the explanation of it is omitted.

After removing noises in the video signal out of desired band width by the band pass filter 312, the amplitude modulated video signal is sent to the adder 316. The adder 316 superposes the FSK modulated signal (300KHz/310KHz, for instance) on the above-mentioned video signal and the resultant duplexed signal is outputted to the core cable 327 of panshaft of the signal-core type coaxial construction through the buffer amplifier 320 and the output matching resistor 325.

The duplexed signal reaches the band pass filter 331 via the buffer amplifier 329, in which only amplitude modulated component is separated from the duplexed signal. After that, the AM demodulator 332 demodulate the AM component, then useless high frequency component in the AM component is removed by the low pass filter 333, thereby obtaining the video signal of the type shown in FIG. 14.

The video signal is sent to the sensor processing circuit 334 and the phase-locked loop circuit 336. The circuit 336 reproduces a continuous pixel clock synchronized with the pixel clock 372 (shown in FIG. 14) having a burst state. The continuous pixel clock is provided to the sensor processing circuit 334 as well as to the synchronizing signal generator 337 where the various kinds of desired synchronizing signals are generated based on the transmitted continuous pixel clock.

In the sensor processing circuit 334, plural kinds of processes, such as decoding of color filtered signal from of a sensor, γ-process, matrix process, are performed in accordance with the video signal and the continuous pixel clock, then the processed signal is outputted to the NTSC encoder 335 in a form of, for instance, a luminance signal and color difference signal.

The output from the NTSC encoder is transmitted to a codec of a teleconference system, for example, as a final video output of the video camera.

Figure 17:
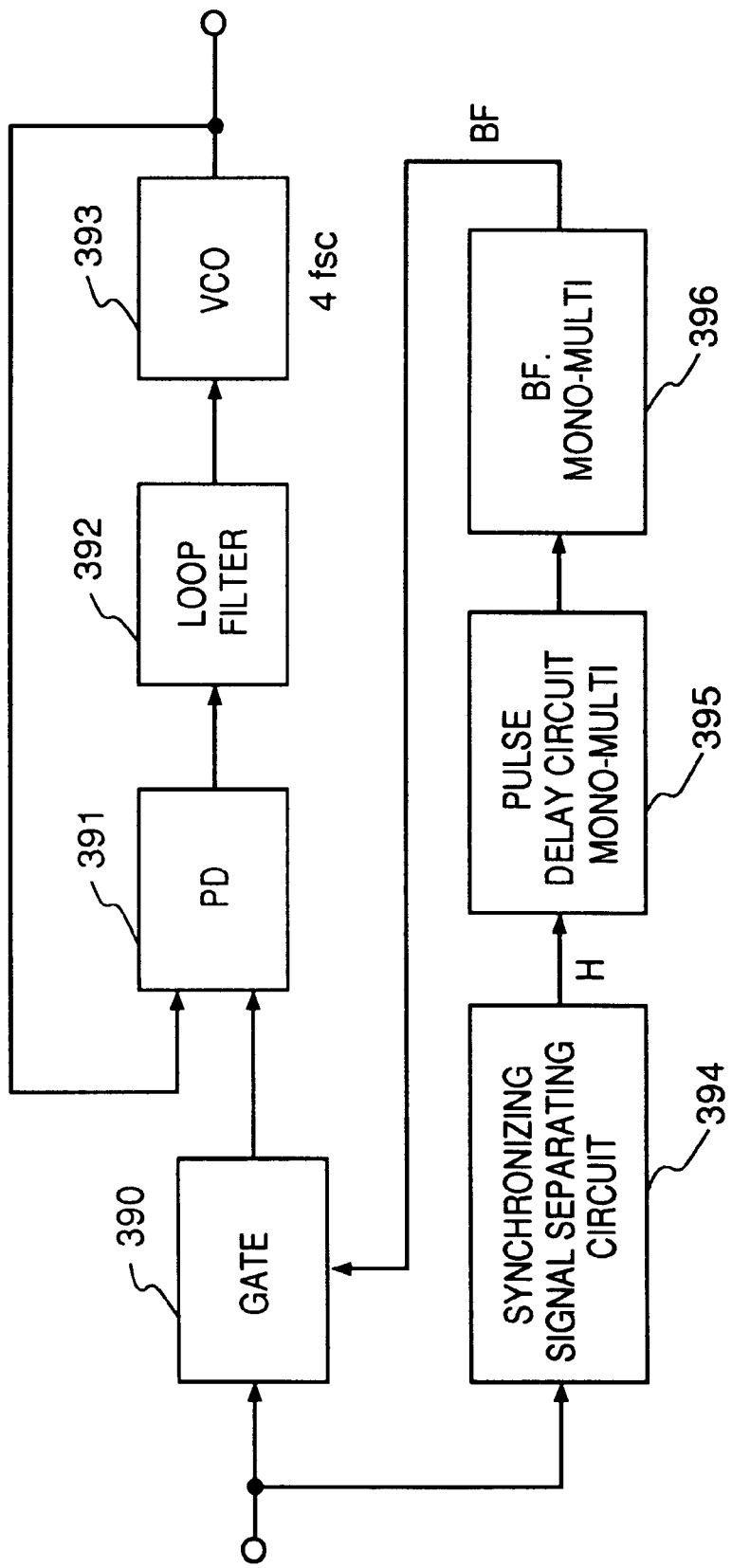
FIG. 17 is a block diagram illustrating a configuration of a phase synchronizing circuit.
Figure 18:
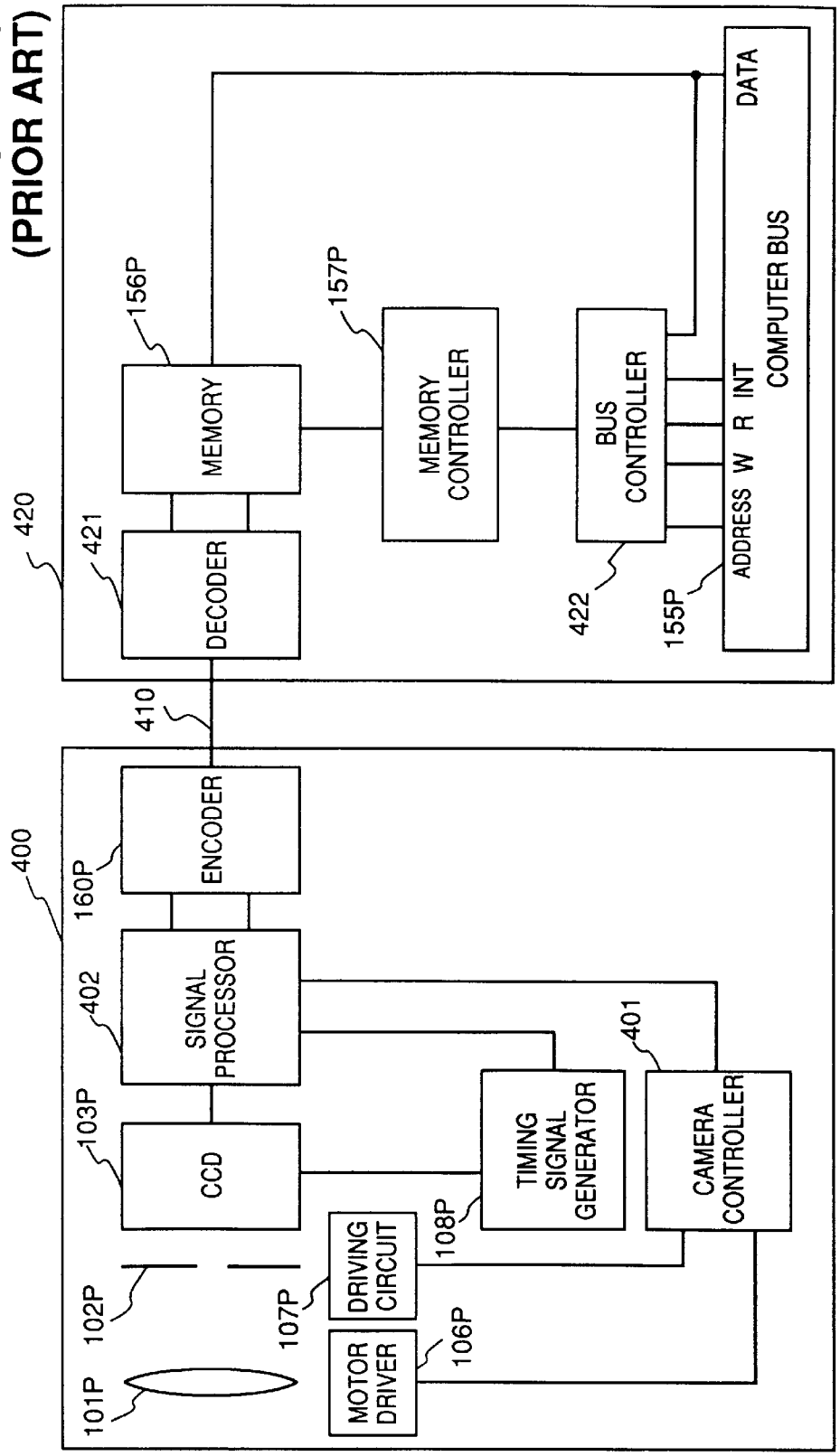
FIG. 18 is a block diagram illustrating a configuration of a conventional image sensing apparatus.

The operation of the aforesaid phase-locked loop circuit 336 will be described supplementary. FIG. 17 is a detailed block diagram of the phase-locked loop circuit as one example. In FIG. 17, reference numeral 390 denotes a gate circuit capable of controlling passage of a signal in accordance with a control signal; 391, a phase comparator (PD); 392, a filter for phase compensation of a control signal in a phase-locked loop; 393, a voltage controlled oscillator having the pixel clock as a central frequency; 394, a separating circuit of a synchronizing signal, especially, a horizontal synchronizing signal; 395, a pulse delay circuit by monostable multivibrator; 396, a mono-stable multivibrator (MM) generating a pulse with a predetermined pulse width.

The video signal having the wave shape in FIG. 14 is transmitted to the gate circuit 390 and the synchronizing signal separating circuit 394, and in the latter circuit, a horizontal synchronizing signal is separated. The horizontal synchronizing signal is converted to a burst flag pulse by the pulse delay circuit 395 and the mono-stable multivibrator 396. Then the burst flag pulse is sent to the gate circuit 390. The gate circuit 390 is "ON" only while the burst flag pulse is sent, and selectively outputs a burst shaped pixel clock.

The burst-shaped pixel clock is sent to the phase comparator 391 as a standard signal, in which the clock is compared with the continuous clock from the voltage controlled oscillator in terms of phase. An erroneous output from the phase comparator 391, after being phase compensated by the loop filter, controls the voltage control oscillator 393 so that the erroneous output disappears. Accordingly, a continuous pixel clock which is synchronized with the burst-type pixel clock is obtained.

As described above, tiltable pan head video camera system of this type, a video camera head of reduced size and weight with no processing circuit is realized by outputting an unprocessed video signal from a sensor, superposed with the burst pixel clock and a composite synchronizing signal, and by providing the processing circuit on the base.

Further, since video camera head is light in weight, the rotational speed of the tiltable pan head becomes higher.

As many apparently widely different embodiments of the present invention can be made without departing from the spirit and scope thereof, it is to be understood that the invention is not limited to the specific embodiments thereof except as defined in the appended claims.

What is claimed is:

1. The image sensing apparatus comprising:
   a camera head unit comprising:
      image forming means for forming an optical image of an object, and
      image sensing means for converting the optical image formed by said image forming means into an electrical image signal; and
   an expansion unit selectively incorporated into a computer, comprising:
      signal processing means, connected with said camera head unit via a communication line, for performing predetermined processing on the electrical image signal provided by said camera head unit;
      bus connection means for selectively connecting said expansion board with said computer; and control means for controlling the operation of said camera head unit by providing communication between said camera head unit and said computer in accordance with a spinal from said computer when said signal processing unit is incorporated in said computer, wherein said camera head unit has storage means for storing information relating to characteristics of said camera unit.

2. The image sensing apparatus according to claim 1, wherein said control means downloads a signal processing program from said computer in accordance with said information relating to characteristics of said camera head unit.

3. The image sensing apparatus according to claim 1, wherein the stored information includes at least one piece of information selected from the stored information regarding a number of picture elements of said image sensing means, information on a television system, and information on cam loci of a group of lenses.

4. The image sensing apparatus according to claim 1, wherein said operation includes at least one of a focus-adjustment operation of said camera head unit, a zooming operation of said camera head unit and an exposure-adjustment operation of said camera head unit.

5. The image sensing apparatus according to claim 1, wherein said expansion board includes a PCMCIA card.

6. The image sensing apparatus according to claim 1, wherein the electrical image signal is a color signal corresponding to the output of a color filter provided in front of said image sensing means.

7. The image sensing apparatus according to claim 1, wherein the electrical image signal is composed of a luminance signal and a color difference signal.

8. The image sensing apparatus according to claim 1, wherein said predetermined processing performed by said signal processing means is variable.

9. The image sensing apparatus according to claim 8, wherein the predetermined processing is changed in accordance with a predetermined program.

10. The image sensing apparatus according to claim 1, wherein said predetermined processing performed by said signal processing means varies with the aid of an application program loaded from the computer.

11. The image sensing apparatus according to claim 1, wherein said expansion board includes a bus controller.

12. An image sensing apparatus comprising a camera head unit for forming an optical image of an object and for converting the optical image into an electrical image signal, wherein said image sensing apparatus is connected to an image signal processing unit via a communication line, for performing predetermined processing on the electrical image signal sent from said camera head unit, said camera head unit comprising:
storage means for storing characteristic data of said camera head unit, said characteristic data including at least one piece of information regarding a number of picture elements of said image forming means, information on a television system and information on cam loci of a group of lenses; and
transmission means for transmitting the characteristic data to said image signal processing unit via the communication line, and said image signal processing unit comprising:
generating means for generating control information for the camera head unit based on the characteristic data transmitted from said camera head unit and the electrical image signal from said camera head unit; and
transmission means for transmitting the control information to said camera head unit via the communication line, and wherein said camera head unit controls operations thereof on the basis of the control information sent from said image signal processing unit.

13. The image sensing apparatus according to claim 12, wherein said image signal processing unit is connected to an external computer via a predetermined interface, and wherein the external computer selects characteristic data corresponding to an identifier of said camera head unit from the stored characteristic data, and sends the selected characteristic data to the image signal processing unit via the interface.

14. The image sensing apparatus according to claim 13, wherein said image signal processing unit generates the control information for the group of lenses on the basis of the characteristic data sent from the external computer.

15. The image sensing apparatus according to claim 12, wherein said expansion board includes a bus controller.

16. An image sensing apparatus comprising a camera head unit for forming an optical image of an object and for converting the optical image into an electrical image signal, and an image signal processing unit, connected to said camera head unit via a communication line, for performing predetermined processing on the electrical image signal sent from said camera head unit, wherein said camera head unit comprises:
storage means for storing characteristic data of said camera head unit, said characteristic data including at least one piece of information regarding a number of picture elements of said image forming means, information on a television system and information on cam loci of a group of lenses; and
transmission means for transmitting the characteristic data to said image signal processing unit via the communication line, and wherein said camera head unit controls operations thereof on the basis of the control information sent from said image signal processing unit.

17. The image sensing apparatus according to claim 16, wherein said expansion board includes a bus controller.

18. An image signal processing apparatus connected to a camera head which forms an optical image of an object and converts the optical image into an electrical image signal, for performing predetermined processing on the electrical image signal sent from said camera head unit, wherein said image signal processing unit comprises:
generating means for generating control information for the camera head unit based on characteristic data transmitted from said camera head unit and the electrical image signal from said camera head unit, said characteristic data including at least one piece of information regarding a number of picture elements of said image forming means, information on a television system and information on cam loci of a group of lenses; and
transmission means for transmitting the control information to said camera head unit via the communication line to have said camera head operate on the basis of the control information sent from said image signal processing unit.

19. The image sensing apparatus according to claim 18, wherein said expansion board includes a bus controller.

20. An image sensing apparatus comprising:
a camera head unit which comprises:
an optical unit for forming an image;

image sensing means for sensing the image formed by said optical unit; and storage means for storing at least one piece of information selected from information regarding a number of picture elements of said image sensing means, information regarding a television system, and information regarding cam loci of said optical unit, and a signal processing unit which comprises:

signal processing means for processing an output signal from said camera head unit; and control means for controlling the operation of said camera head unit in accordance with said at least one piece of information.

21. The image sensing apparatus according to claim 20, wherein said operation of the camera head unit includes at least one of a focus-adjustment operation of said optical unit, a zooming operation of said optical unit and an exposure-adjustment operation of said optical unit.

22. The image sensing apparatus according to claim 20, wherein said signal processing unit is an expansion board selectively incorporated into a computer.

23. The image sensing apparatus according to claim 22, wherein said control means controls the operation of said optical unit in accordance with a signal from said computer when said signal processing unit is incorporated in said computer.

24. The image sensing apparatus according to claim 23, wherein said signal processing unit is a PCMCIA card unit.

25. The image sensing apparatus according to claim 20, wherein said expansion board includes a bus controller.

26. An image sensing apparatus comprising:

a camera head unit which comprises:

image forming means for forming an optical image of an object; and image sensing means for converting the optical image formed by said image forming means into an electrical image signal; and an expansion unit selectively incorporated into a computer, which comprises:

signal processing means, connected with said camera head unit via a communication line, for performing predetermined processing on the electrical image signal provided by said camera head unit, the predetermined processing being variable and changed in accordance with a predetermined program; and control means for controlling the operation of said camera head unit by providing communication between said camera head unit and said computer.

27. An image sensing apparatus comprising:

a camera head unit which comprises:

image forming means for forming an optical image of an object; and image sensing means for converting the optical image formed by said image forming means into an electrical image signal; and an expansion board selectively incorporated into a computer, which comprises:

signal processing means, connected with said camera head unit via a communication line, for performing predetermined processing on the electrical image signal provided by said camera head unit, said predetermined processing varying with the aid of an application program loaded from said computer; and control means for controlling the operation of said camera head unit by providing communication between said camera head unit and said computer.

28. The image sensing apparatus according to claim 26, wherein said expansion board includes a bus controller.

29. The image sensing apparatus according to claim 27, wherein said expansion board includes a bus controller.

* * * * *

UNITED STATES PATENT AND TRADEMARK OFFICE
CERTIFICATE OF CORRECTION

PATENT NO. : 6,046,769  
APPLICATION NO. : 08/887565  
DATED : April 4, 2000  
INVENTOR(S) : Ikeda et al.

Page 1 of 1

It is certified that error appears in the above-identified patent and that said Letters Patent is hereby corrected as shown below:

On the Title Page

Item [54], the title "SENSING APPARATUS" should be changed to -- IMAGE SENSING APPARATUS --

Item [75] Inventors, "Yokohama" and "Sagamihara" should both be changed to -- Kanagawa --

In the Specification

In Column 19, Line 4, "spinal" should be changed to -- signal --

Signed and Sealed this

Tenth Day of March, 2009

JOHN DOLL  
*Acting Director of the United States Patent and Trademark Office*

UNITED STATES PATENT AND TRADEMARK OFFICE
CERTIFICATE OF CORRECTION

PATENT NO. : 6,046,769
APPLICATION NO. : 08/887565
DATED : April 4, 2000
INVENTOR(S) : Ikeda et al.

It is certified that error appears in the above-identified patent and that said Letters Patent is hereby corrected as shown below:

On the Title Page

Item [54] and Column 1, line 1 the title "SENSING APPARATUS" should be changed to -- IMAGE SENSING APPARATUS --

Item [75] Inventors, "Yokohama" and "Sagamihara" should both be changed to -- Kanagawa --

In the Specification

In Column 19, Line 4, "spinal" should be changed to -- signal --

This certificate supersedes the Certificate of Correction issued March 10, 2009.

Signed and Sealed this

Thirty-first Day of March, 2009

JOHN DOLL
*Acting Director of the United States Patent and Trademark Office*